(12) United States Patent
Ackley

(10) Patent No.: US 11,568,661 B2
(45) Date of Patent: *Jan. 31, 2023

(54) METHODS AND SYSTEMS FOR DATA RETRIEVAL FROM AN IMAGE

(71) Applicant: Hand Held Products, Inc., Fort Mill, SC (US)

(72) Inventor: H. Sprague Ackley, Seattle, WA (US)

(73) Assignee: HAND HELD PRODUCTS, INC., Fort Mill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/789,174

(22) Filed: Feb. 12, 2020

(65) Prior Publication Data

US 2020/0184208 A1 Jun. 11, 2020

Related U.S. Application Data

(63) Continuation of application No. 15/948,500, filed on Apr. 9, 2018, now Pat. No. 10,614,301.

(51) Int. Cl.
*G06V 30/00* (2022.01)
*G06V 30/40* (2022.01)
(Continued)

(52) U.S. Cl.
CPC .......... *G06V 30/40* (2022.01); *G06F 16/3334* (2019.01); *G06F 40/10* (2020.01); *G06V 10/225* (2022.01); *G06V 30/10* (2022.01)

(58) Field of Classification Search
CPC .............. G06K 2209/01–015; G06K 9/00442; G06K 9/2063; G06F 16/3334; G06F 17/21; G06V 30/00–43
See application file for complete search history.

(56) References Cited

U.S. PATENT DOCUMENTS 5,764,813 A 6/1998 Murayama et al.
5,987,170 A 11/1999 Yamamoto et al.
(Continued)

OTHER PUBLICATIONS

Mohapatra, Y. et al., Spell Checker for OCR, International Journal of Computer Science and Information Technologies, vol. 4(1) (2013) 91-97.

(Continued)

*Primary Examiner* — Sean T Motsinger
(74) *Attorney, Agent, or Firm* — Alston & Bird LLP

(57) ABSTRACT

Various embodiments illustrated herein disclose a method that includes receiving a plurality of images from an image capturing unit. Thereafter, an image evaluation process is executed on each of plurality of sections in each of the plurality of images. The image evaluation process includes performing optical character recognition (OCR) on each of the plurality of sections in each of the plurality of images to generate text corresponding to the plurality of respective sections. Further, the image evaluation process includes querying a linguistic database to identify one or more errors in the generated text. Further, the method includes modifying one or more image characteristics of each of the plurality of images and repeating the execution of the image evaluation process on the modified plurality of images until at least the calculated statistical score is less than a pre-defined statistical score threshold.

18 Claims, 15 Drawing Sheets

(51) Int. Cl.
*G06F 16/33* (2019.01)
*G06F 40/10* (2020.01)
*G06V 10/22* (2022.01)
*G06V 30/10* (2022.01)

(56) References Cited

U.S. PATENT DOCUMENTS

| | | | |
|---|---|---|---|
| 7,546,955 B2 | 6/2009 | Marty et al. | |
| 8,331,739 B1 | 12/2012 | Abdulkader et al. | |
| 8,718,365 B1* | 5/2014 | Bissacco | G06K 9/34 |
| | | | 382/175 |
| 2003/0031366 A1 | 2/2003 | Li et al. | |
| 2004/0086179 A1* | 5/2004 | Ma | G06K 9/723 |
| | | | 382/177 |
| 2004/0122641 A1 | 6/2004 | Miller et al. | |
| 2005/0289182 A1 | 12/2005 | Pandian et al. | |
| 2006/0204099 A1* | 9/2006 | Kimura | G06K 9/036 |
| | | | 382/182 |
| 2013/0161103 A1 | 6/2013 | Metzger et al. | |
| 2014/0133767 A1 | 5/2014 | Lund et al. | |
| 2014/0324648 A1* | 10/2014 | Mori | G06F 3/167 |
| | | | 705/31 |
| 2015/0055866 A1 | 2/2015 | Cummins et al. | |
| 2015/0220778 A1 | 8/2015 | Macciola et al. | |
| 2016/0125275 A1 | 5/2016 | Hamada et al. | |
| 2016/0180163 A1* | 6/2016 | Ming | G06K 9/4652 |
| | | | 382/164 |
| 2017/0068866 A1* | 3/2017 | Kostyukov | G06K 9/18 |
| 2017/0083900 A1* | 3/2017 | Faraci | G06K 19/06037 |
| 2018/0157906 A1 | 6/2018 | Loginov et al. | |
| 2018/0157907 A1* | 6/2018 | Loginov | G06K 9/00442 |
| 2018/0349743 A1 | 12/2018 | Chulinin | |
| 2019/0065880 A1* | 2/2019 | Loginov | G06K 9/6274 |
| 2019/0138853 A1 | 5/2019 | Goncalves et al. | |
| 2019/0311193 A1 | 10/2019 | Ackley | |

OTHER PUBLICATIONS

Notice of Allowance for U.S. Appl. No. 15/948,500, dated Dec. 2, 2019, 10 pages.

OCR Spell Checking: Description, CVISION Technologies, [online] [retrieved Apr. 9, 2018]. Retrieved from the Internet: ttp://www.cvisiontech.com/library/pdf/pdf-ocr/ocr-spell-checking.html>. (undated) 2 pages.

* cited by examiner

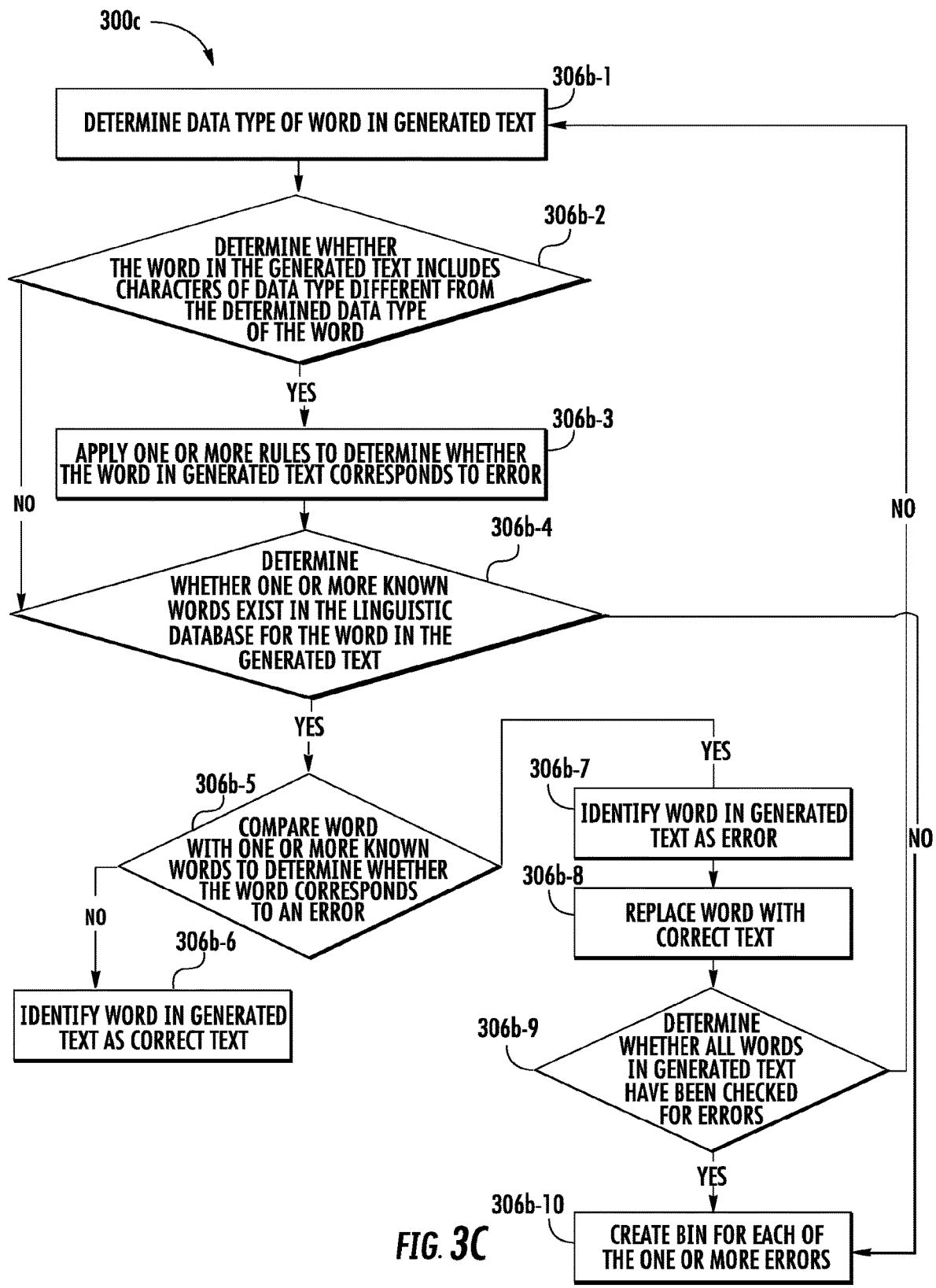

METHODS AND SYSTEMS FOR DATA RETRIEVAL FROM AN IMAGE

TECHNOLOGICAL FIELD

Exemplary embodiments of the present disclosure relate generally to image processing and, more particularly, to methods and systems that facilitate data retrieval from an image.

BACKGROUND

Various image processing techniques such as edge detection, pattern matching, and optical character recognition (OCR) allow retrieval of data from an image. For example, by performing the OCR on an image, text can be retrieved from the image.

A typical OCR system recognizes text by identifying one or more characters in the image. To this end, the OCR system may utilize a pattern matching algorithm and an edge detection algorithm to identify a pattern in the image. Thereafter, the OCR system may compare the determined pattern with a template pattern to determine a character corresponding to the determined pattern. Similarly, the OCR system may recognize other characters in the image.

The accuracy of the OCR system (to identify the one or more characters) may be dependent on the quality of the image. For instance, if the quality of the image (from which the one or more characters are to be identified) is below par, the OCR system may misinterpret certain characters in the image. Further, in certain scenarios, the OCR system may misinterpret certain characters in good quality images.

Applicant has identified a number of deficiencies and problems associated with conventional methods of OCR image processing. Through applied effort, ingenuity, and innovation, many of these identified problems have been solved by developing solutions that are included in embodiments of the present disclosure, many examples of which are described in detail herein.

BRIEF SUMMARY

Various embodiments illustrated herein disclose a system that includes a non-transitory computer-storage medium, configured to store a linguistic database. Further, the system includes a processor, in electrical communication with the non-transitory computer-storage medium. The processor is configured to receive a plurality of images. Further, the processor is configured to segment the plurality of images into a plurality of sections, wherein each section of each image of the plurality of images corresponds to another section of another image of the plurality of images. Furthermore, the processor is configured to execute an image evaluation process on each section of each image of the plurality of images. The image evaluation process includes (a) performing optical character recognition (OCR) on each section to generate text corresponding to each section. Further, the image evaluation process includes (b) querying, for the generated text corresponding to each section, a linguistic database to identify one or more errors in the generated text, and to calculate a statistical score based on the identification of the one or more errors. Additionally, the processor is configured to determine, for each section, whether the statistical score is less than a pre-defined statistical score threshold. In response to determining that the statistical score associated with a section of plurality of sections is more than or equal to the pre-defined statistical score threshold, the processor is configured to (c) generate a modified section by modifying one or more image characteristics associated with the section. Further, the processor is configured to iteratively repeat steps (a), (b), and (c) for each section until the statistical score associated with the section or its corresponding modified section is less than the pre-defined statistical score threshold. Subsequently, the processor is configured to determine a plurality of groups corresponding to the plurality of sections, wherein each group of the plurality of groups comprises one or more of corresponding sections and corresponding modified sections of the plurality of images, wherein the corresponding sections and corresponding modified sections in each group have the same content. Thereafter, the processor is configured to select an optimal section from each group, wherein generated text corresponding to the optimal section has a minimum number of errors among generated texts of the corresponding sections and the corresponding modified sections in the corresponding group. Furthermore, the processor is configured to combine each optimal section from each corresponding group to generate a processed image.

In accordance with another aspect, the image evaluation process further comprises: identifying erroneous text associated with the one or more errors, replacing the erroneous text with correct text, comprising modifying one or more characters in the generated text corresponding to the one or more errors based on querying the linguistic database.

In accordance with another aspect, the statistical score is calculated based on a first count of the one or more errors, and a second count of the one or more characters modified during replacing the erroneous text.

In accordance with another aspect, the processor is further configured to create a bin for each of the one or more errors identified in the generated text associated with each of the plurality of sections, wherein the bin includes the correct text.

In accordance with another aspect, the processor is further configured to correct an error of the one or more errors in the generated text corresponding to the optimal section, wherein the correct text for the error is selected from the bin generated for the error.

In accordance with another aspect, the processor is further configured to select, for a section of the plurality of sections, an intermediate optimal section among the section and its corresponding one or more modified sections, wherein generated text corresponding to the selected intermediate optimal section has minimum errors among generated texts corresponding to the section and the corresponding one or more modified sections.

In accordance with another aspect, the optimal section is selected based on the selection of the intermediate optimal section.

In accordance with another aspect, the processor is configured to store the generated text for each section of the plurality of sections after execution of each instance of the image evaluation process.

Various embodiments illustrated herein disclose a computer-implemented method comprising: segmenting, by a processor, a plurality of images into a plurality of sections, wherein each section of each image of the plurality of images corresponds to another section of another image of the plurality of images; executing an image evaluation process on each section of each image of the plurality of images, wherein the image evaluation process comprises: (a) performing optical character recognition (OCR) on each section to generate text corresponding to each section; and (b) querying, for the generated text corresponding to each section, a linguistic database to: identify one or more errors in the generated text, and calculate a statistical score based on the identification of the one or more errors; determining, for each section, whether the statistical score is less than a pre-defined statistical score threshold; in response to determining that the statistical score associated with a section of plurality of sections is more than or equal to the pre-defined statistical score threshold: (c) generating a modified section by modifying one or more image characteristics associated with the section, and iteratively repeating steps (a), (b), and (c) for each section until the statistical score associated with the section or its corresponding modified section is less than the pre-defined statistical score threshold; determining a plurality of groups corresponding to the plurality of sections, wherein each group of the plurality of groups comprises one or more of corresponding sections and corresponding modified sections of the plurality of images, wherein the corresponding sections and corresponding modified sections in each group have same content; selecting an optimal section from each group, wherein generated text corresponding to the optimal section has a minimum number of errors among generated texts of the corresponding sections and the corresponding modified sections in the corresponding group; and combining each optimal section from each corresponding group to generate a processed image.

Various embodiments illustrated herein disclose an apparatus comprising at least one processor and at least one non-transitory memory including program code, the at least one non-transitory memory and the program code configured to, with the processor, cause the apparatus to at least receive a plurality of images. Further, the apparatus is configured to segment the plurality of images into a plurality of sections, wherein each section of each image of the plurality of images corresponds to another section of another image of the plurality of images. Furthermore, the apparatus is configured to execute an image evaluation process on each section of each image of the plurality of images. The image evaluation process includes (a) performing optical character recognition (OCR) on each section to generate text corresponding to each section. Further, the image evaluation process includes (b) querying, for the generated text corresponding to each section, a linguistic database to identify one or more errors in the generated text, and to calculate a statistical score based on the identification of the one or more errors. Additionally, the apparatus is configured to determine, for each section, whether the statistical score is less than a pre-defined statistical score threshold. In response to determining that the statistical score associated with a section of plurality of sections is more than or equal to the pre-defined statistical score threshold, the apparatus is configured to (c) generate a modified section by modifying one or more image characteristics associated with the section. Further, the apparatus is configured to iteratively repeat steps a., b., and c. until the statistical score associated with the modified section, generated for each section, is less than the pre-defined statistical score threshold. Subsequently, the apparatus is configured to determine a plurality of groups corresponding to the plurality of sections, wherein each group of the plurality of groups comprises one or more of the section and the modified section, generated across the plurality of images, wherein the one or more of the section and the modified section in each group have same content. Thereafter, the apparatus is configured to select an optimal section from each group, wherein generated text corresponding to the optimal section has a minimum number of errors among generated texts of the one or more of the section and the modified section in the corresponding group. Furthermore, the apparatus is configured to combine each optimal section from each corresponding group to generate a processed image.

Various embodiments illustrated herein disclose a computer program product comprising at least one processor and at least one non-transitory memory including program code, the at least one non-transitory memory computer-readable storage medium having computer-readable program code portions stored therein, the computer-readable program code portions comprising an executable portion configured to: segment a plurality of images into a plurality of sections, wherein each section of each image of the plurality of images corresponds to another section of another image of the plurality of images; execute an image evaluation process on each section of each image of the plurality of images, wherein the image evaluation process comprises: (a) performing optical character recognition (OCR) on each section to generate text corresponding to each section; and (b) querying, for the generated text corresponding to each section, a linguistic database to: identify one or more errors in the generated text, and calculate a statistical score based on the identification of the one or more errors; determine, for each section, whether the statistical score is less than a pre-defined statistical score threshold; in response to determining that the statistical score associated with a section of plurality of sections is more than or equal to the pre-defined statistical score threshold: (c) generating a modified section by modifying one or more image characteristics associated with the section, and (d) iteratively repeat steps (a), (b), and (c) until the statistical score associated with the modified section, generated for each section, is less than the pre-defined statistical score threshold; determine a plurality of groups corresponding to the plurality of sections, wherein each group of the plurality of groups comprises one or more of the section and the modified section, generated across the plurality of images, wherein the one or more of the section and the modified section in each group have same content; select, an optimal section from each group, wherein generated text corresponding to the optimal section has a minimum number of errors among generated texts of the one or more of the section and the modified section in the corresponding group; and combine each optimal section from each corresponding group to generate a processed image.

Various embodiments illustrated herein disclose a computer-implemented method that includes receiving, by a processor, a plurality of images of a document. Further, the method includes executing, by the processor, an image evaluation process on each image of the plurality of images. The image evaluation process comprises performing, by the processor, an optical character recognition (OCR) to generate text in each image of the plurality of images. Further, the method includes querying, for the generated text corresponding to each image, a linguistic database to (a) identify one or more errors in the generated text, and (b) calculate a statistical score based on identification of the one or more errors. Furthermore, the method includes determining, for each image, whether the statistical score is less than a pre-defined statistical score threshold. Additionally, the method includes, in response to determining that the statistical score associated with an image of plurality of images is more than or equal to the pre-defined statistical score threshold, (c) generate a modified image by modifying one or more image characteristics associated with the image, and iteratively repeat steps (a), (b), and (c) for each image until the statistical score associated with the image or its corresponding modified image is less than the pre-defined statistical score threshold. Subsequently, the method includes selecting, by the processor, an optimal image among the plurality of images and corresponding modified images, wherein the generated text corresponding to the optimal image has minimum errors.

In accordance with another aspect, the image evaluation process further comprises: identifying erroneous text associated with the one or more errors; and replacing the erroneous text with correct text, comprising: modifying one or more characters in the generated text corresponding to the one or more errors based on querying the linguistic database.

In accordance with another aspect, the statistical score is calculated based on a first count of the one or more errors, and a second count of the one or more characters modified during replacing the erroneous text.

In accordance with another aspect, the computer-implemented method further comprises storing the generated text for each of the plurality of images after execution of each instance of the image evaluation process.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

The accompanying drawings illustrate embodiments of the disclosure, and, together with the specification, including the general description above and the detailed description which follows, serve to explain the features of the present disclosure.

FIGS. 3A, 3B, 3C, 3D, 3E, 3F, 3G, and 3H are flowcharts illustrating example methods, including processing a plurality of images, in accordance with one or more embodiments described herein;

DETAILED DESCRIPTION

Figure 1:
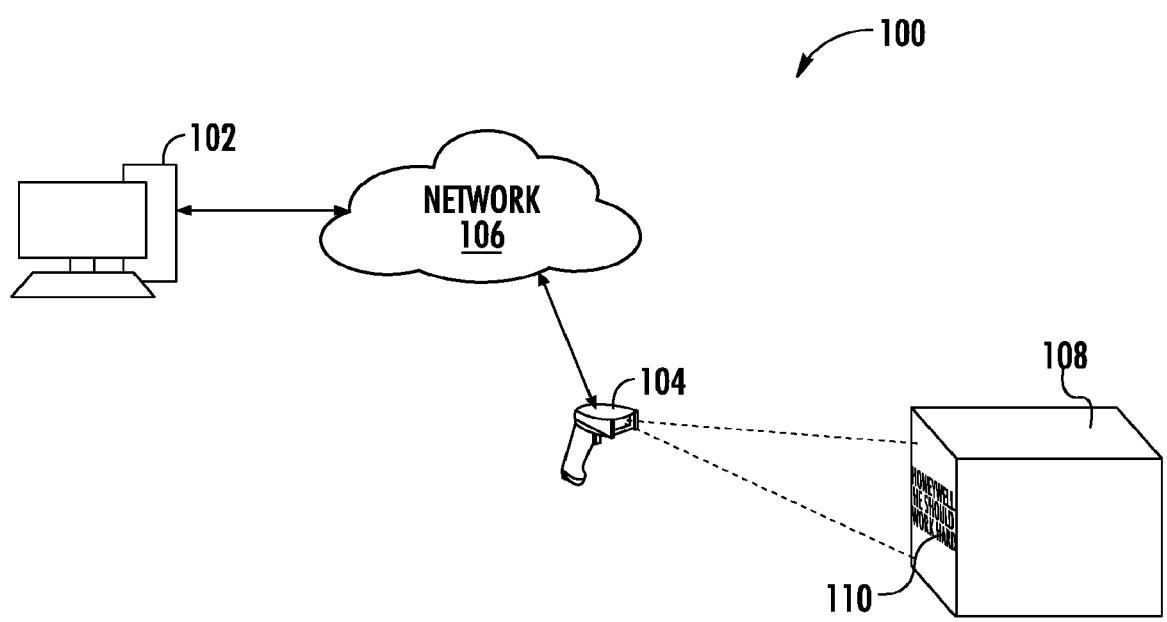
FIG. 1 illustrates a system environment where various example embodiments of the present disclosure may be implemented.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout. Terminology used in this patent is not meant to be limiting insofar as devices described herein, or portions thereof, may be attached or utilized in other orientations, unless otherwise provided.

The term "comprising" means including but not limited to, and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic in some embodiments. Such component or feature may be optionally included in some embodiments, or it may be excluded.

As used herein, the term "image" refers to an electronic file containing picture of content and meta-data information such as, but not limited to, a file-format/type, a compression/encryption scheme usable for compressing/encrypting the content, a creation/access timestamp, and so on. In an example embodiment, the image may be represented using one or more color schemes such as but not limited to, RGB (Red-Green-Blue), HSV (Hue-Saturation-Value), YCbCr, Gray Scale, black/white thresholded and so on.

In some examples, in environments such as retail stores, an operator has limited time to scan/capture images of items (at point of sale terminals) to retrieve the cost of items. This may compromise the quality of the captured images. When OCR is performed on such images to retrieve data (for example, cost of the items), there is a high likelihood of erroneously identifying characters/text in the image. In some examples, the erroneous text may be corrected manually. However, manual inputting the correct text is time-consuming and inefficient. Further, manually inputting the correct text may require the operator to refer to the original image. However, as the original image may be out of focus and hazy, the data manually inputted by the operator may also be inaccurate, as the operator may be unable to identify the text from the original image.

Example embodiments illustrated herein provide methods and systems that facilitate retrieval of data from an image. An image capturing unit such as a camera or an indicia scanner is configured to capture a plurality of images of a predetermined scene (included in a field of view of the image capturing unit) from which the data is to be retrieved. For example, if the data is to be retrieved from a document, the plurality of images of the document is captured. In an example embodiment, the image capturing device may include an image capturing assembly (described later in conjunction with FIG. 1) that enables the image capturing device to capture the plurality of the images of the predetermined scene.

In some examples, a processor may receive the plurality of images from the image capturing assembly. Further, the processor may be configured to process the plurality of images to retrieve the data from the images. For example, the processor is configured to segment each of the plurality of images into a plurality of sections. For each section of the plurality of sections, the processor may be configured to perform an image evaluation process. In the image evaluation process, the processor may be configured to perform OCR on each section (in the plurality of sections) to identify text (hereinafter referred to as generated text) contained in each section.

The processor may be further configured to identify one or more errors in the generated text by querying the generated text against a pre-stored linguistic database. In an example embodiment, the linguistic database includes a list of words, acronyms, and phrases that are commonly used in a predetermined language or predetermined domain. For example, if the text content is in English language, the linguistic database (utilized for querying) includes words and phrases from English language. Similarly, if the text content is in French language, the linguistic database (utilized for querying) includes words and phrases from French language. In some embodiments, the scope of the disclosure is not limited to having a language (i.e., English or French) based linguistic database. In an example embodiment, the linguistic database may include words, acronyms, and phrases that are commonly used in a particular domain. For example, if the domain is "mechanical engineering", the linguistic database may include words, acronyms, and phrases that are commonly used to explain mechanical domain technologies. Similarly, linguistic database comprising words, acronyms, and phrases of other domains may be contemplated. In an example embodiment, the linguistic database may be updated, automatically or manually, with new words and/or phrases, as is further described in FIG. 3H.

For each of the one or more errors, the processor may be configured to identify erroneous text based on querying of the linguistic database. Further, the processor may be configured to replace the erroneous text with correct text. In an example embodiment, replacing the erroneous text comprises modifying one or more characters in the erroneous text based on querying of the linguistic database.

In an example embodiment, the processor may be further configured to determine a first count of the one or more errors in the generated text. Additionally, the processor may be configured to determine a second count of the one or more characters modified in the erroneous text. Based on the first count of the one or more errors and the second count of the one or more characters modified, the processor may be configured to determine a statistical score. In an example embodiment, the statistical score may be indicative of a quality of the OCR operation performed on each section.

Concurrent to replacing the erroneous text with correct text, the processor may be configured to create a bin for each of the one or more errors, identified in the generated text, (obtained from each section), across the plurality of images. In an example embodiment, the bin may correspond to a database or a data-structure that is configured to store words and phrases that correspond to the correct text for an error identified in the generated text. In an example embodiment, the processor may be configured to populate the bin with the correct text based on the replacement of the erroneous text with the correct text.

After the determination of the statistical score for each section of the plurality of sections, the processor may be configured to compare the statistical score with a predefined statistical score threshold to determine whether the statistical score is less than a predefined statistical score threshold. If, for a section of the plurality of sections, the statistical score is greater than or equal to the predefined statistical score threshold, the processor may be configured to generate modified section by modifying one or more image characteristics of the section. Thereafter, the processor is configured to repeat the image evaluation process on the modified section until the statistical score determined for the modified section is less than the predefined statistical score threshold. Further, the processor may be configured to repeat the image evaluation process for each section of the plurality of sections segmented from each image of the plurality of images.

Once the image evaluation process is performed on the plurality of sections across the plurality of images, the processor may be configured to determine a plurality of groups. In an example embodiment, each group of the plurality of groups corresponds to a section of the plurality of sections. Further, each group of the plurality of groups includes one or more of the corresponding original sections or the corresponding modified section, determined (during the image evaluation process) across the plurality of images. In an example embodiment, the one or more of the original sections or the corresponding modified section, in a group of the plurality of groups, correspond to a same portion of the predetermined scene (captured by the image capturing device).

After the creation of the plurality of groups, the processor may be configured to select an optimal section from each group. As each group includes one or more of the original sections and the corresponding modified sections, therefore, the processor selects the optimal section amongst the one or more of the original sections and the corresponding modified sections. In an example embodiment, the optimal section is selected in such a manner that the statistical score associated with the optimal section is minimum among the one or more of the original sections or the corresponding modified sections. Further, since the statistical score is deterministic of the first count of the one or more errors, the first count of the one or more errors identified in the generated text of the optimal section is also minimum. In some examples, the processor may be further configured to combine the optimal section, selected from each group of the plurality of groups, to generate a processed image.

Because the processed image includes optimal sections that have minimum statistical score amongst the plurality of sections across the plurality of images, when the OCR operation is performed on the processed image, fewer errors will be identified in the generated text obtained from the processed image than the generated text obtained from the plurality of original images.

In an example embodiment, additionally, the processor may be further configured to correct each of the one or more errors in the generated text identified from the processed image by selecting correct text from the bin. As discussed, the bin includes the correct text (determined across the plurality of images) for a corresponding error. Therefore, the bin includes a list of correct text determined for the corresponding error. To select the correct text for the error, the processor is configured to select a text (from the bin) that has been identified as the correct text in a maximum number of times. For example, a bin for an error "$hould" may include the correct text such as "should", "could," and "would," where "should" has been identified as the correct text two times, while "could" and "would" have been identified as the correct text three times and five times, respectively. In such an example, the processor may select "would" as the correct text for the error, since the text "would" has been identified as the correct text for maximum number of times during the correction of the one or more errors (in the generated text) across the plurality of images.

As the correct text for an error is being selected from the bin based on consensus, therefore, there is high likelihood that the text selected from the bin to correct the error in the generated text of the processed image is the correct text for the error. Since the identification of the correct text is performed automatically, no manual intervention is required in identification of the text from the image.

FIG. 1 schematically depicts a system environment 100 where various example embodiments of the present disclosure may be implemented. The system environment 100 includes a computing device 102 and an image capturing device 104 (depicted as an indicia scanner). The computing device 102 and the image capturing device 104 may be communicatively coupled with each other through a network 106. Although the image capturing device 104 has been depicted as the indicia scanner, various other hardware elements such as a flatbed scanner, an overhead scanner, or a mobile phone camera, can constitute the image capturing device 104.

The computing device 102 refers to a device that includes one or more processors/microcontrollers and/or any other electronic components, or a device or a system, which performs one or more operations according to one or more programming instructions/codes. Examples of the computing device 102 may include, but are not limited to, a desktop computer, a laptop, a personal digital assistant (PDA), a mobile device, a smartphone, a tablet computer, and the like. In an example embodiment, the computing device 102 includes suitable interfaces that may enable the computing device 102 to communicate with the image capturing device 104 through the network 106. For example, the computing device 102 may be configured to receive a plurality of images from the image capturing device 104. Further, for example, the computing device 102 may be configured to process the plurality of images to retrieve content from the plurality of images, as is described further in FIGS. 3A, 3B, 3C, 3D, 3E, 3F, 3G, and 3H. Various components of the computing device 102 has been further described in conjunction with FIG. 2.

The image capturing device 104 may correspond to a device that may be configured to capture the plurality of images of a scene in a field of view of the image capturing device 104. For example, the image capturing device 104 may be configured to capture the plurality of images of an object 108. In an example embodiment, the image capturing device 104 may include an illumination assembly that may be configured to illuminate the field of view of the image capturing device 104. The illumination assembly may, for example, include an illumination source, an illuminating optics assembly, such as one or more lenses, diffusers, wedges, reflectors or a combination of such elements, for directing light from illumination source in the direction of the field of view. For example, if the image of the object 108 is to be captured, the illumination assembly may be configured to direct the light on the object 108. Some examples of the illumination source may include, for example, laser or light emitting diodes (LEDs) such as white LEDs or red LEDs. Further, the image capturing device 104 includes an imaging assembly that may further include an image sensor, such as a color or monochrome 1D or 2D Charge Coupled Device (CCD), Complementary Metal-Oxide-Semiconductor (CMOS), N-channel Metal-Oxide-Semiconductor (NMOS), P-channel Metal-Oxide-Semiconductor (PMOS), Charge Injection Device (CID) or Charge Modulation Device (CMD) solid state image sensor, together with an imaging optics assembly for receiving and focusing an incident light (from the ambient) on the image sensor. Some examples of the image capturing device 104 may include, but are not limited to, an indicia scanner, a flatbed scanner, a camera, and/or any other device that is capable of capturing the plurality of images. In an example embodiment, the image capturing device 104 further includes a communication interface that may enable the image capturing device 104 to transmit the plurality of images to the computing device 102 through the network 106.

The network 106 corresponds to a medium through which content and messages flow between various devices in the system environment 100 (e.g., the computing device 102 and the image capturing device 104). Examples of the network 106 may include, but are not limited to, a Wireless Fidelity (Wi-Fi) network, a Wireless Area Network (WAN), a Local Area Network (LAN), or a Metropolitan Area Network (MAN). Various devices in the system environment 100 can connect to the network 106 in accordance with various wired and wireless communication protocols such as Transmission Control Protocol and Internet Protocol (TCP/IP), User Datagram Protocol (UDP), 2G, 3G, 4G, 5G communication protocols, Bluetooth®, Bluetooth Low Energy (BLE), and I2C®.

The object 108 may correspond to an item, which is to be captured by the image capturing device 104. Some examples of the object 108 may include, but are not limited to, a package, a carton, and a document. In an example embodiment, the object 108 may have a predetermined content (depicted by 110) printed on it. Some examples of the content (depicted by 110) printed on the object 108 may include, but not limited to, text content, pictorial content, a pattern such as an indicia, and/or combination thereof. For the purpose of ongoing description, it is assumed that the content (depicted by 110) printed on the object 108 is text content 110, without limiting the scope of the disclosure.

When in operation, the image capturing device 104 captures the plurality of images of the object 108 on receiving an input from at least a user of the image capturing device 104. For example, the user may push a trigger button (not shown) on the image capturing device 104 to capture the plurality of image. The plurality of images of the object 108 may include an image of the text content (depicted by 110) printed on the object 108. The plurality of images is provided to the computing device 102 via the network 106.

Thereafter, the computing device 102 may be configured to process the plurality of images to retrieve content from the plurality of images, as is further described in FIGS. 3A, 3B, 3C, 3D, 3E, 3F, 3G, and 3H. Further, the computing device 102 may be configured to generate a processed image based on processing of the plurality of images, as is further described in FIGS. 3A, 3B, 3C, 3D, 3E, 3F, 3G, and 3H.

In some embodiments, the scope of the disclosure is not limited to process the plurality of images by the computing device 102. In an example embodiment, the processing of the plurality of images may be executed by the image capturing device 104, without departing from the scope of the disclosure. For the purpose of the ongoing description, it is assumed that the plurality of images are processed by the computing device 102.

Figure 2:
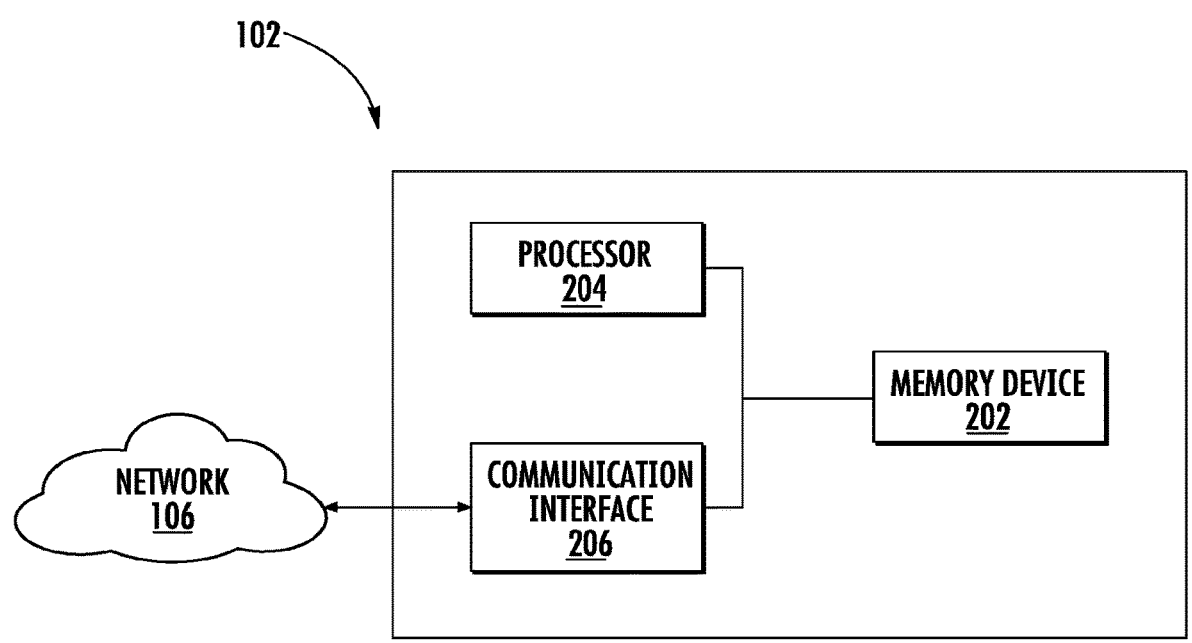
FIG. 2 illustrates a block diagram of a computing device, in accordance with one or more embodiments described herein.

FIG. 2 illustrates a block diagram of the computing device 102, in accordance with one or more embodiments. The computing device 102 includes a memory device 202, a processor 204, and a communication interface 206. The memory device 202 and the communication interface 206 are communicatively coupled with the processor 204.

The memory device 202 may include suitable logic, circuitry, and/or interfaces that are adapted to store a set of instructions that is executable by the processor 204 to perform the predetermined operation. Some of the commonly known memory implementations include, but are not limited to, a random access memory (RAM), a read only memory (ROM), a hard disk drive (HDD), and a secure digital (SD) card. In an example embodiment, the memory device 202 may be integrated along with the processor 204 on a single chip, without departing from the scope of the disclosure. In an example embodiment, the memory device 202 may be configured to store a linguistic database 208, as further shown in FIG. 4A. The linguistic database 208 may refer to a repository of words related to particular subject. For example, the linguistic database 208 may correspond to an English language linguistic database that may include a set of words or text phrases that are commonly used in the English language. In another example, the linguistic database 208 may correspond to a mechanical tools linguistic database that may include a list of words that represents the name of the mechanical tools.

The processor 204 may include suitable logic, circuitry, and/or interfaces that are operable to execute one or more instructions stored in the memory device 202 to perform predetermined operations. For example, the processor 204 may be configured to receive the plurality of images from the image capturing device 104. Further, the processor 204 may be configured to process the plurality of images to generate the processed image, as is further described in FIGS. 3A to 8. The processor 204 may be implemented using one or more processor technologies known in the art. Examples of the processor 204 include, but are not limited to, an x86 processor, an Advanced RISC Machines (ARM) processor, a Reduced Instruction Set Computing (RISC) processor, an Application-Specific Integrated Circuit (ASIC) processor, a Complex Instruction Set Computing (CISC) processor, or any other processor.

The communication interface 206 may correspond to an input/output interface that facilitates transmission and reception of messages and data to and from various devices operating in the system environment 100 through the network 106. For example, the communication interface 206 facilitates transmission and reception of data to/from the image capturing device 104 over the network 106. Examples of the communication interface 206 may include, but are not limited to, an antenna, an Ethernet port, an RFID tag, a USB port, a serial port, or any other port that can be adapted to receive and transmit data. The communication interface 206 transmits and receives data and/or messages in accordance with the various communication protocols, such as, I2C, TCP/IP, UDP, and 2G, 3G, or 4G communication protocols.

Figure 3A:
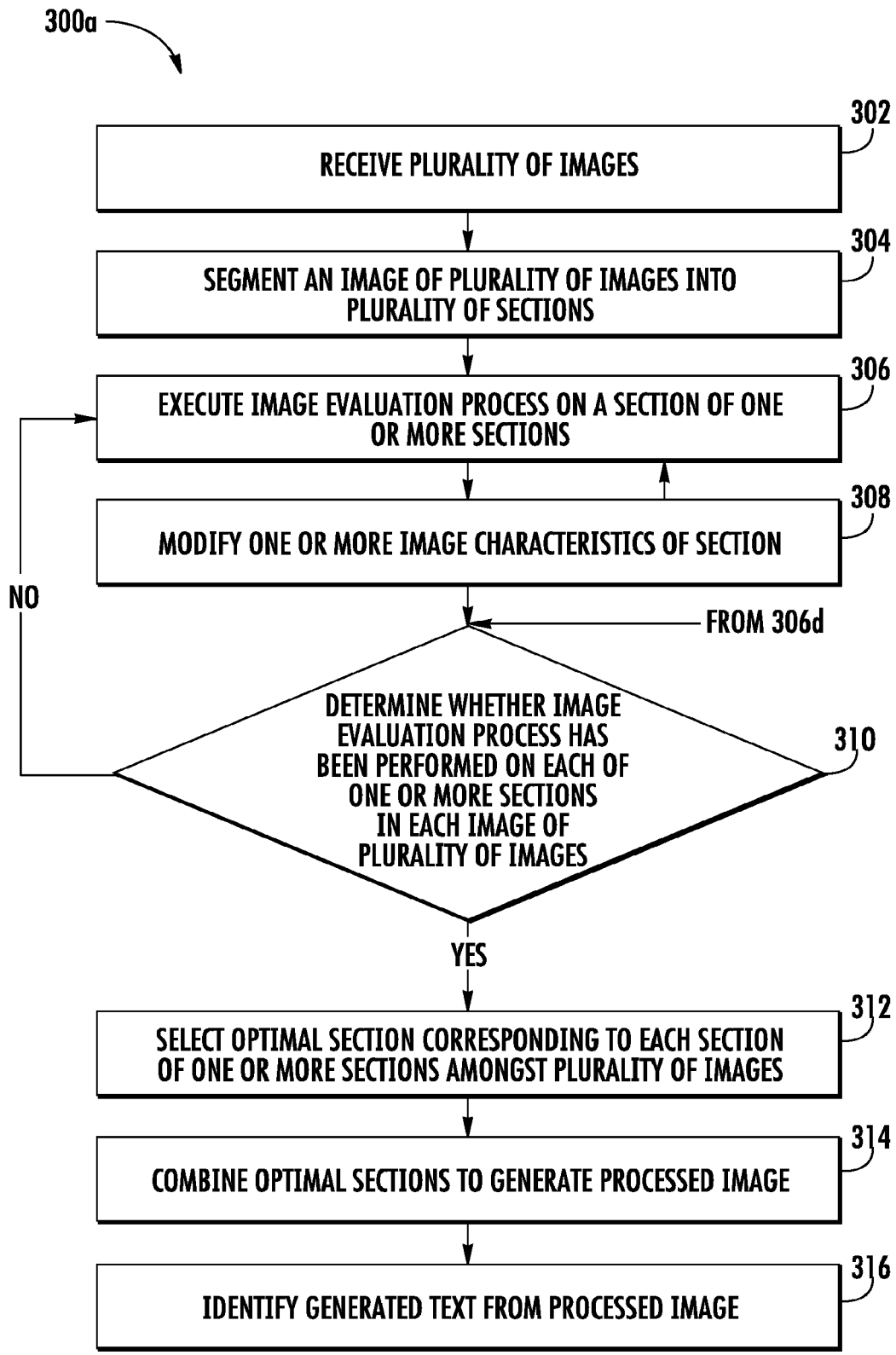
Figure 4A:
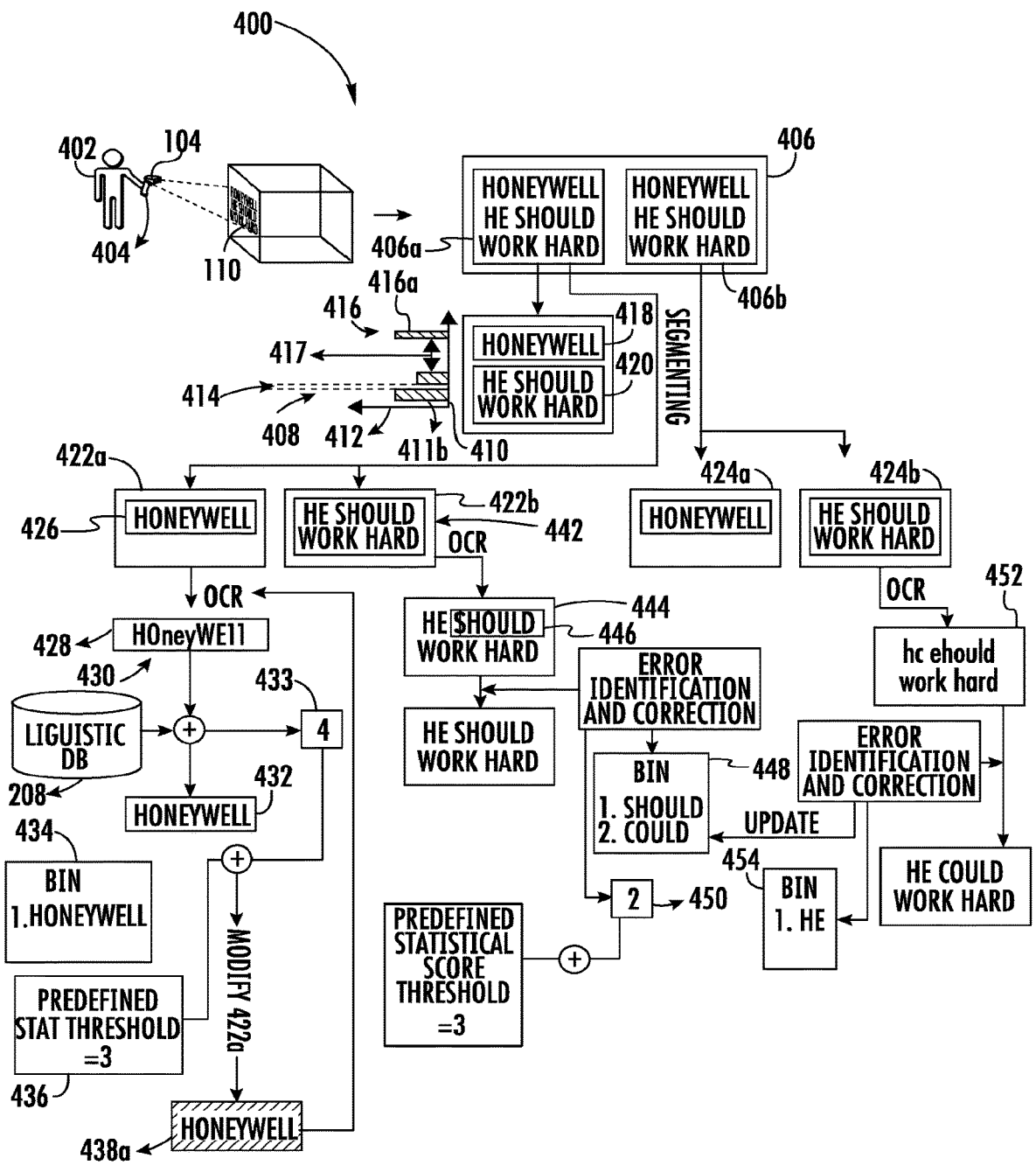
FIGS. 4A and 4B illustrate example methods, including processing a plurality of images, in accordance with one or more embodiments described herein.
Figure 4B:
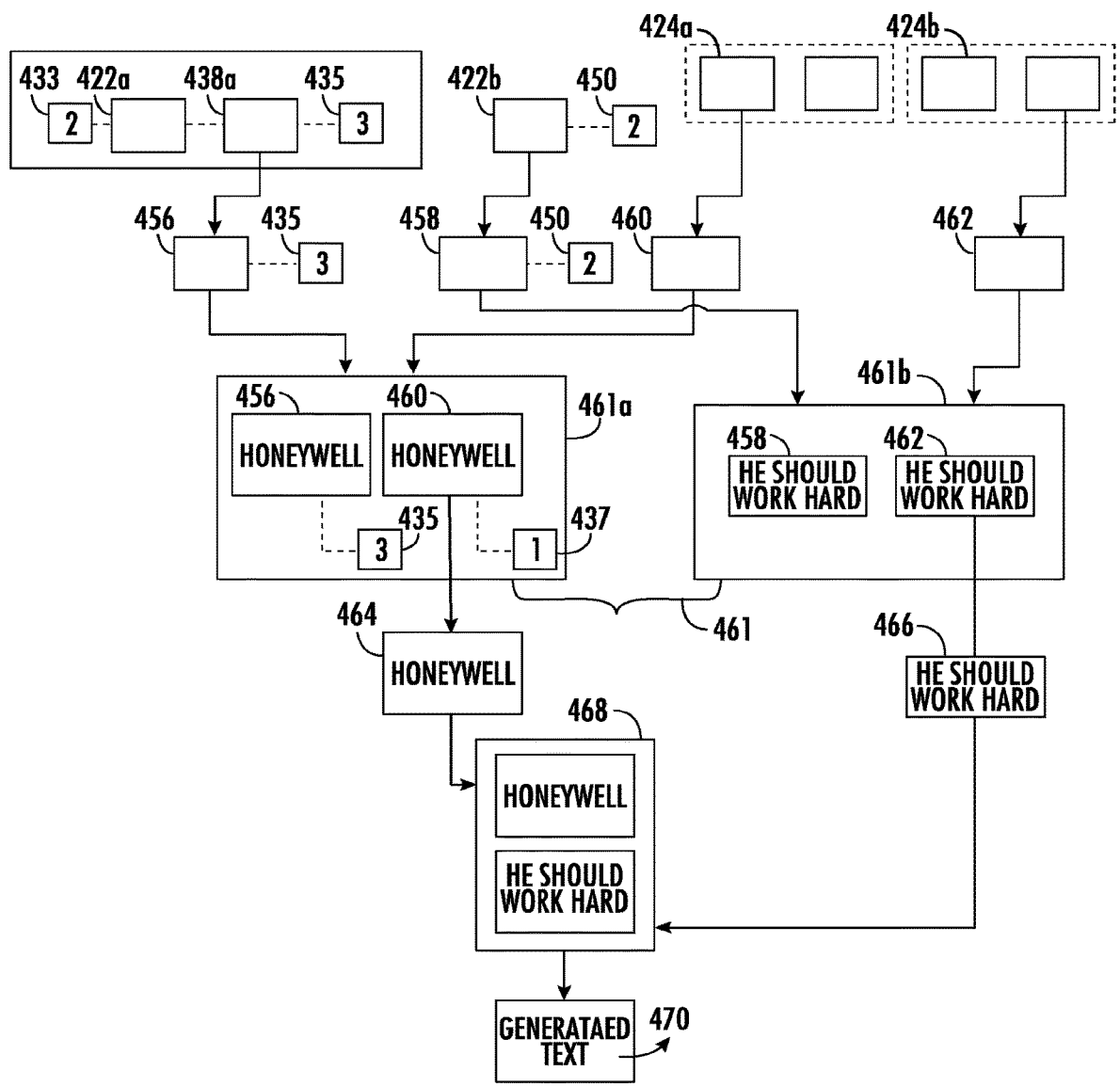

Referring to FIG. 3A, FIG. 4A and FIG. 4B, a flowchart 300a and an exemplary method 400 for processing the plurality of images in accordance with one or more embodiments described herein are illustrated.

At step 302, the computing device 102 includes means, such as the processor 204, for receiving the plurality of images of the object 108 through the communication interface 206. Prior to receiving the plurality of images, the user of the image capturing device 104 may provide the input on the image capturing device 104 to capture the plurality of images of the object 108. For instance, referring to FIG. 4A, a user 402 pushes a trigger button 404 on the image capturing device 104 to capture the plurality of images (for example the images 406) of the object 108. It can be observed that the object 108 has the text content 110 printed on it. Therefore, the plurality of images (for example the images 406) captured by the image capturing device 104 includes the images of the text content 110.

In an example embodiment, the image capturing device 104 may be configured to continuously capture images of the object 108, while the user 402 is pressing the trigger button 404. In some embodiments, a count of images captured by the image capturing device 104 (while the user 402 is pressing the trigger button 404) may be dependent on at least the shutter speed of the image capturing device 104. In an example embodiment, the shutter speed of the image capturing device 104 may correspond to a time period for which the light from the object 108 is allowed to fall on the image sensor in the image capturing device 104. After the capturing of the plurality of images (for example the images 406) the image capturing device 104 may be configured to transmit the plurality of images (for example the images 406) to the computing device 102 over the network 106. For the purpose of describing FIG. 4A, the plurality of images 406 includes a first image 406a and a second image 406b. However, in some embodiments, the plurality of images 406 includes more than two images, for example, 10 images.

At step 304, the computing device 102 may include means, such as the processor 204, for segmenting an image of the plurality of images into a plurality of sections. For example, the processor 204 may be configured to segment the image in such a manner that each section of the plurality of sections (segmented from the image) includes at least a portion of the text content 110 (for example a paragraph). In such an embodiment, the processor 204 may first identify the one or more paragraphs in the text content 110 captured in the plurality of images. To identify the one or more paragraphs in each image of the plurality of images, the processor 204 may be configured to determine a count of the pixels, which represent the text content 110, along a width of the image. In an example embodiment, the processor 204 may identify the pixels representing the text content 110 based on at least color characteristics associated with the pixels. For example, the processor 204 may consider the pixels having black color as the pixels representing the text content 110.

Thereafter, processor 204 may be configured to analyze a distribution of the count of pixels (representing the text content 110) along a length of the image to identify a spacing between the lines in the text content 110, and a spacing between the paragraphs in the text content 110. For example, referring to FIG. 4A, the distribution of the count of pixels for the first image 406a has been represented in form of a graphical representation 408 that includes x-axis 410 and y-axis 412. The y-axis 412 represents the count of pixels and x-axis 410 represents the length of the first image 406a. It can be observed that the distribution of the count of the pixels includes valleys 414 and peaks 416. The peaks 416 represents the presence of the text content 110 in the first image 406a, while the valleys 414 represents absence of the text content in the first image 406a. In an example embodiment, the processor 204 may be configured to analyze the valleys 414 and the peaks 416 to identify the one or more paragraphs in the first image 406a. For example, the processor 204 may be configured to determine width of the valleys (depicted by 417) to determine the line spacing in the text content 110. In an example embodiment, the line spacing may correspond to a spacing between two adjacent lines in the text content 110. If the processor 204 determines that the line spacing between the two adjacent lines is less than a threshold value of line spacing, the processor 204 is configured to determine that the two adjacent lines are part of a paragraph in the text content 110. If the determined line spacing is greater than the threshold value, the processor 204 may determine that two adjacent lines are part of different paragraphs. For example, the processor 204 may be configured to identify a portion 418 in the first image 406a corresponding to the peak 416a as a paragraph. Further, the processor 204 may be configured to identify a portion 420 of the first image 406a (corresponding to the peak 416b) as a paragraph.

In some embodiments, the scope of the disclosure is not limited to identifying the paragraphs in the text content 110 captured in the plurality of images by analyzing the distribution of the pixels. In some embodiments, the processor 204 may be configured to utilize other image processing techniques such as, but not limited to, edge detection, and pattern recognition to identify paragraphs in the text content 110 captured in the plurality of images.

In some example embodiments, the scope of the disclosure is not limited to segmenting the plurality of images based on identification of the paragraphs in the plurality of images. In an example embodiment, the plurality of images may be segmented based on other identifiable features captured in the plurality of images. For example, the processor 204 may be configured to segment the plurality of images in the plurality of sections such that each section include a single line of the text content 110. In such an embodiment, the processor 204 may be configured to identify lines in the text content 110 (captured in each image) prior to segmenting the plurality of images. In an example embodiment, the processor 204 may employ similar methodologies, as described above to identify the paragraphs, to identify the lines in the text content 110.

For the purpose of the ongoing description, the plurality of images has been illustrated to be segmented based on identification of the paragraphs. However, it may be contemplated that other features, as mentioned above, may be utilized to segment the plurality of images.

After the identification of the one or more paragraphs in the text content 110 captured in the plurality of images, the processor 204 may be configured to segment the image into the plurality of sections such that each section of the plurality of sections includes the identified paragraphs. Since the text content 110 captured in the plurality of images is the same, the paragraphs identified by the processor 204 across the plurality of image are also the same. Therefore, a section segmented from an image of the plurality of images (comprising a paragraph) corresponds to another section segmented of another image of the plurality of images (i.e., the paragraphs included in both the section and another section will be same). For example, referring to FIG. 4A, the first image 406a is segmented into a first section 422a and a second section 422b. Both the first section 422a and the second section 422b include a paragraph of the text content 110 captured in the first image 406a. Further, the first section 422a includes the portion 418 of the first image 406a, while the second section 422b includes the portion 420 of the first image 406a. Further, the second image 406b is segmented into a first section 424a and a second section 424b, and both the sections 424a and 424b include a paragraph of the text content 110 captured in the second image 406b. Furthermore, it can be observed that the paragraph of the text content 110 in the first section 422a and the first section 424a is same. Therefore, the first section 422a corresponds to the first section 424a. Similarly, the second section 422b corresponds to the second section 424b.

Referring back to FIG. 3A, at step 306, the computing device 102 includes means, such as the processor 204, for executing the image evaluation process on a section of the plurality of sections (obtained from an image of the plurality of images). The image evaluation process 306 is further described in conjunction with FIG. 3B.

Figure 3B:
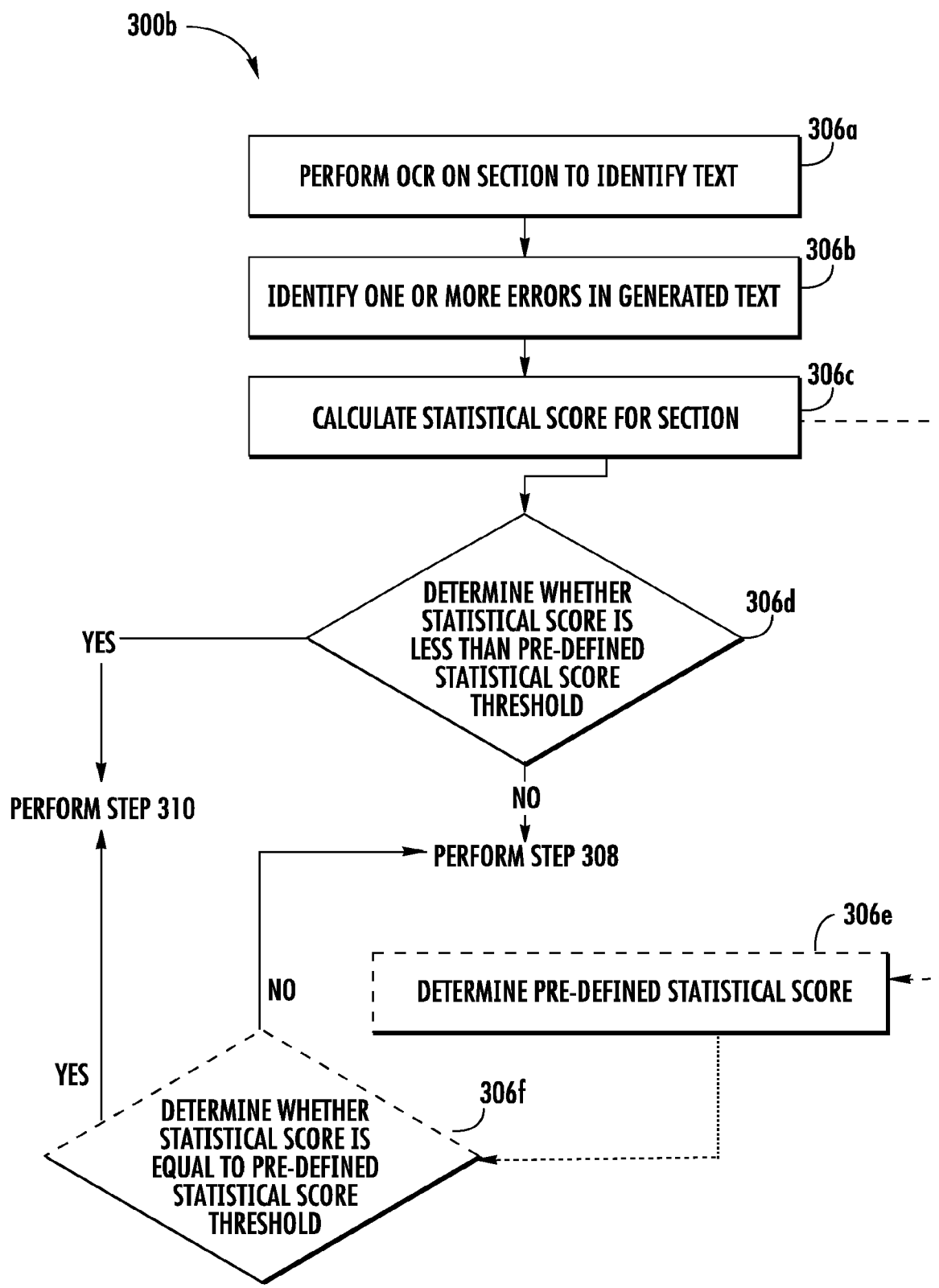

Referring to FIG. 3B, a flowchart 300B illustrates a method for executing the image evaluation process, such as, for example, step 306 as described above with reference to FIG. 3A in accordance with some embodiments.

At step 306a, the computing device 102 includes means, such as the processor 204, for performing an OCR on the section (segmented from the image) to identify text in the section. As discussed, the section includes the paragraph of the text content 110 (captured in the image), and the OCR operation identifies the text of the paragraph included in the section. Hereinafter, the identified text has been interchangeably referred to as the generated text.

To perform the OCR operation, the processor 204 may be configured to apply one or more image processing techniques such as, but not limited to, edge detection to determine one or more contours in the section. In an example embodiment, the one or more determined contours may represent characters constituting various words in the paragraph included in the section. Thereafter, the processor 204 may be configured to match each of the one or more determined contours with one or more template contours to identify the characters. In an example embodiment, a template contour corresponds to a reference contour of known characters. Therefore, based on the matching of the one or more determined contours with the one or more template contours, the processor 204 is able to identify the characters corresponding to each of the one or more determined contours, thereby identifying the text in the section (i.e., the generated text).

In some embodiments, the characters may be erroneously identified, due to various factors such as, but not limited, quality of image of the section. For example, referring to FIG. 4A, the word "Honeywell" (depicted by 426) in the first section 422a may get identified as "H0neywel1" (depicted by 428) in the generated text (depicted by 430). In this example, character "o" has been erroneously identified as "0". Further, character "l" has been erroneously identified as "1." Such misidentification of the characters is considered as an error in the generated text.

Referring back to FIG. 3B, at step 306b, the computing device 102 includes means, such as the processor 204, for identifying one or more errors in the generated text. The identification of the one or more errors has been further described in conjunction with FIG. 3C.

Referring to FIG. 3C, a flowchart 300C illustrates a method for identifying one or more errors in the generated text, such as, for example, step 306b as described above with reference to FIG. 3B in accordance with some embodiments.

At step 306b-1, the computing device 102 may include means, such as the processor 204, for determining a data type of a word in the generated text. In an example embodiment, the data type may correspond to a type of characters that may constitute the word. Some examples of the data type of the characters may include, but not limited to, numerals, special characters, and alphabetical characters. In an example embodiment, the processor 204 may be configured to identify the data types of the characters constituting the word by determining American Standard Code for Information Interchange (ASCII) codes associated with each characters constituting the word. It is understood by a person having ordinary skills in the art that each type of the character has a predefined ASCII code. For instance, the alphabetic characters have an ASCII code from 0041-005A and 0061-007A.

Based on the ASCII code associated with the characters in the word, the processor 204 may be configured to determine the data type of the word. For example, to determine the data type of the word, the processor 204 may be configured to determine a count of the characters of each data type included in the word. Thereafter, the processor 204 may determine the data type based on which data type has the maximum characters in the word. The processor 204 may consider the determined data type as the data type of the word. For example, referring to FIG. 4A, for the word "H0neywel1" (depicted by 428) in the generated text 430 (identified by the processor 204 in the first section 422*a*), the processor 204 determines that there are 6 characters of type alphabetical characters, and three characters of type numeral. Therefore, the processor 204 may determine the data type of the word "H0neywel1" (depicted by 426) as alphabetical word.

At step 306*b*-2, the computing device 102 may include means, such as the processor 204, for determining whether the word in the generated text includes characters of a data type different from the determined data type of the word. If the processor 204 determines that the word (in the generated text) includes characters of different data type, the processor 204 may determine that there is a likelihood that the word includes erroneous text. For example, referring to FIG. 4A, the processor 204 determines the word "H0neywel1" (depicted by 426) identified in the first section 422*a* includes numerals, which is contrary to the data type of the word "H0neywel1" (which is alphabetical word). Therefore, the processor 204 may determine that there is high likelihood that the word "H0neywel1" (depicted by 426) in the generated text includes erroneous text. Accordingly, the processor 204 may perform the step 306*b*-3. However, if the processor 204 determines that the word in the generated text does not include characters of different data types, the processor 204 may be configured to perform the step 306*b*-4.

At step 306*b*-3, the computing device 102 may include means, such as the processor 204, for applying one or more rules to determine whether the word in the generated text corresponds to an error. In an example embodiment, the one or more rules may correspond to a series of checks performed by the processor 204 to determine whether the word in the generated text includes erroneous text. Some example rules are described herein.

For example, the processor 204 may determine whether the word includes characters of special character data type. Thereafter, processor 204 may determine a type of the special character, a position of the special character in the word, and the data type of the word. In an example embodiment, the type of the special character may be determined based on the ASCII code of the characters in the word. Based on the type of the special character, the position of the special character in the word, and the data type of the word, the processor 204 may determine whether the word in the generated text corresponds to the error. For instance, the processor 204 determines that the data type of the word is alphabetical character, and the special character in the word is a hyphen "-". In such a scenario, the processor 204 may determine that there is a likelihood that the word may correspond to correct text, and accordingly, performs the step 306*b*-4. Similarly, in some scenarios, the processor 204 determines that the word in the generated text includes the special character "$" that is placed at the start of the word and that the word is of numeral data type. In such scenarios, the processor 204 determines that word may be a monetary figure and hence may correspond to a correct text. However, if the processor 204 determines that the data type of the word (having the special character $) is alphabetical character, the processor 204 may determine that the word may include an erroneous text.

In some embodiments, the scope of the disclosure should not be limited to the aforementioned rules. In an example embodiment, similar rules may be defined to detect the one or more errors in the generated text.

If at step 306*b*-3, the processor 204 determines that the word in the generated text may correspond to correct text, the processor 204 may perform the step 306*b*-4. At step 306*b*-4, the computing device 102 includes means, such as the processor 204, determining whether one or more known words exist in the linguistic database for the word in the generated text. To determine whether the one or more known words exist, the processor 204 may be configured to query the linguistic database 208 to retrieve one or more known words from the linguistic database 208 based on the word in the generated text and a predefined distance. In an example embodiment, the predefined distance may be indicative of a degree of similarity between two words (for instance, the one or more known words and the word in the generated text). For example, the predefined distance is representative of a count of operations (comprising of insertions, deletions or substitutions of a single character, or transposition of two adjacent characters) required to change one word into the other. For example, the distance between the word "should" and "would" is 2, as the count of substitutions that need to be performed on the word "should" to arrive at word "would" is two.

In an example embodiment, utilizing the predefined distance to retrieve the one or more known words facilitates retrieval of only those known words from the linguistic database 208 that are relevant to the word in the generated text. For example, if the predefined distance value is three, the processor 204 may be configured to retrieve the one or more known words from the linguistic database 208 that are at most at the distance of three from the word (in the generated text). Similarly, if the predefined distance value is zero, the processor 204 will only retrieve those known words that exactly match the word in the generated text. In an example embodiment, the processor 204 may utilize one or more known querying languages such as, but not limited to, data query language (DQL), contextual query language (CQL), Structured Query language (SQL) to query the linguistic database 208 and to accordingly retrieve the one or more known words.

In some embodiments, the processor 204 may not be able to identify any known words from the linguistic database for the word in the generated text. For example, if the predefined distance is three and the processor 204 (at step 306*b*-4) determines that no known word in the linguistic database is at a distance less than three from the word, the processor 204 determines that no known words are present in the linguistic database corresponding to the word.

In an example embodiment, if the processor 204 determines that, for the word in the generated text, the one or more known words exist in the linguistic database, the processor 204 may be configured to perform the step 306*b*-5. However, if the processor 204 determines that, for the word in the generated text, no known word exist in the linguistic database, the processor 204 may be configured to perform the step 306*b*-10.

At step 306*b*-5, the computing device includes means, such as the processor 204, for comparing the word with the one or more known words (retrieved from the linguistic database 208) to determine whether the word in the generated text corresponds to an error. To perform the comparison, the processor 204 is configured to determine the predefined distance between the word (in the generated text) and one or more known words in the linguistic database 208.

If during comparison, the processor 204 determines that the predefined distance between word in the generated text and a known word (defined in the linguistic database 208) is zero, the processor 204 performs the step 306*b*-6. At step 306*b*-6, the computing device 102 include means, such as the processor 204, for determining that the word (identified in the generated text) corresponds to the correct text. Thereafter, the processor 204 may be configured to perform the step 306*b*-9 (described later).

However, if the processor 204 determines that no known word of the one or more known words retrieved from the linguistic database 208 is at a distance of zero from the word in the generated text, the processor 204 performs the step 306*b*-7. At step 306*b*-7, the computing device 102 may include means, such as the processor 204, for identifying the word as the error. In an example embodiment, identifying the word as the error represents that the word includes the erroneous text. Accordingly, the processor performs the step 306*b*-8.

At step 306*b*-8, the computing device 102 includes means, such as the processor 204, for replacing the erroneous text in the word in the generated text with correct text. In an example embodiment, the processor 204 identifies one of the one or more known words retrieved from the linguistic database 208 as the correct text for the word in the generated text, based on the distance between the word (in the generated text) and the one or more known words (defined in the linguistic database 208). In an example embodiment, the word identified as the correct text is at a minimum distance from other word of the one or more known words.

For example, referring to FIG. 4A, the word "H0neywel1" (depicted by 426) is determined as an error by the processor 204 in the step 306*b*-7. Further, in accordance with the step 306*b*-8, the processor 204 determines that the word "Honeywell" (depicted by 432) is at a minimum distance from the word "H0neywel1" (depicted by 426) (for example, at the distance of 3). Therefore, the processor 204 determines the word "Honeywell" (depicted by 432), as the correct text for the word "H0neywel1" (depicted by 428). Further, the processor 204 may replace the text "H0neywel1" (depicted by 428) with "Honeywell" (depicted by 432) in the generated text (depicted by 430).

In an example embodiment, at step 306*b*-9, the computing device 102 includes means, such as the processor 204, for determining whether all the words in the generated text have been checked for errors. If the processor 204 determines that not all the words in the generated text have been checked for errors, the processor 204 may be configured to repeat the steps 306*b*-1 through 306*b*-8 for other words in the generated text to identify the one or more errors in the generated text and accordingly to correct the one or more errors in the generated text. In an example embodiment, the generated text where the one or more errors have been corrected is referred to as a modified generated text.

If at step 306*b*-9, the processor 204 determines that all the words, in the generated text, have been checked for errors, the processor 204 may be configured to perform the step 306*b*-10. At step 306*b*-10, the computing device 102 includes means, such as the processor 204, for creating a bin for each of the one or more errors identified in the generated text. In an example embodiment, the processor 204 may be configured to store the correct text, determined by the processor 204 in the step 306*b*-8, in the bin. For instance, referring to FIG. 4A, the processor 204 may be configured to create a bin (depicted by 434) for the error "H0neywel1" (depicted by 428) that includes the correct text "Honeywell" (depicted by 432).

In some example embodiments, the scope of the disclosure is not limited to determining the one or more errors in the generated text by querying the linguistic database 208. In an example embodiment, the processor 204 may be further configured to apply grammatical rules on the modified generated text to identify grammatical errors in the modified generated text. Further, the processor 204 may be configured to correct the grammatical errors in the modified generated text based on the grammatical rules. For example, if the modified generated text includes phrase " . . . module have been . . . ", the processor 204 may identify phrase as an error due to incorrect tense form. Subsequently, the processor 204 may be configured to apply the grammatical rules to determine that the word "have" should have been the word "has". Accordingly, the processor 204 changes the modified generated text to include the phrase " . . . module has been . . . ."

In some embodiments, as discussed above in step 306*b*-4, the processor 204 is unable to retrieve the one or more known words for the word (identified as an error) in the generated text. In such embodiment, the processor 204 may be configured to create the bin for the word. Further, such bin includes the word as identified during the OCR operation (at step 306*a*). For example, the processor 204 identifies the word "$123" during the OCR operation. Further, the processor 204 determines at step 306*b*-4 that no such known words in the linguistic database. For such a scenario, the processor 204 creates the bin for the word that includes the word as identified (i.e., $123) during the OCR operation. Further, the processor 204 considers the word included in the bin as the correct text.

In some example embodiment, the scope of the disclosure is not limited to performing the steps as the sequence mentioned in the FIG. 3C. In an example embodiment, the sequence of steps 306*b*-4 and 306*b*-5 may be performed prior to performing the steps 306*b*-2 and 306*b*-3, without limiting the scope of the disclosure.

Referring back to FIG. 3B, at step 306*c*, the computing device 102 includes means, such as the processor 204, for calculating a statistical score for the section. To calculate the statistical score, the processor 204 may be configured to determine a first count of the one or more errors identified in the generated text identified from the section. In some embodiments, the processor 204 may be configured to determine the first count of the one or more errors as the statistical score of the section.

In alternate embodiment, the processor 204 may be configured to determine the statistical score based on a second count of the one or more characters modified during the replacement of the erroneous text (as described in the step 306*b*-8) with the correct text. In an example embodiment, to determine the second count, the processor 204 may be configured to retrieve the distance between the word (that includes erroneous text) and the corresponding correct text (determined in step 306*b*-8). Thereafter, the processor 204 may be configured to determine a cumulative distance for the section based on the distance determined for each of the one or more errors. In some embodiments, the cumulative distance corresponds to an average distance. In alternate embodiment, the cumulative distance corresponds to a sum of the distances determined for each of the one or more error. For example, the generated text identified from a section includes two errors; the distance associated with the first error of the two errors is five and the distance associated with the second error is three. In such a scenario, the processor 204 may be configured to determine the cumulative distance as eight (i.e., sum of the two distances). In alternate embodiment, the processor 204 may be configured to determine the cumulative distance as four (i.e., average of the two distances). In an example embodiment, the cumulative distance corresponds to the second count. In some embodiments, the processor 204 may be configured to consider the second count, determined for the section, as the statistical score for the section. In yet another embodiment, the processor 204 may be configured to consider the sum of the second count and the first count of the one or more errors as the statistical score.

Referring to FIG. 4A, the processor 204 may be configured to determine the statistical score (depicted by 433) as "1" for the first section 422a, as the first count of the one or more errors identified in the first section 422a is one. In alternate embodiment, the processor 204 may determine the statistical score (depicted by 433) as "3" for the first section 422a, as the second count is three (i.e., the characters modified to arrive at the correct text "Honeywell" (depicted by 426)). In yet another embodiment, the processor 204 may determine the statistical score (depicted by 433) as "4" for the first section 422a, which is determined as the sum of the first count of one or more errors in the first section 422a (i.e., one), and the second count of the character modified (i.e., three).

In an example embodiment, the processor 204 may be configured to store the section (i.e., image of section), the modified generated text, and the statistical score determined for the section, in the memory device 202.

At step 306d, the computing device 102 may include means, such as the processor 204, for determining whether the calculated statistical score is less than a pre-defined statistical score threshold. In an example embodiment, the pre-defined statistical score threshold corresponds to a value of statistical score which indicates that the OCR operation performed in the step 306a is acceptable. If the processor 204 determines that the calculated statistical score is greater than or equal to the pre-defined statistical score threshold, the processor 204 may determine that the OCR performed by the processor 204 is inaccurate, and that the quality of the image of the section is not acceptable. Subsequently, the processor 204 may be configured to perform the step 308.

In some embodiments, the processor 204 may be configured to determine the pre-defined statistical score threshold as a predetermined percentage of a count of words identified during the the OCR operation (referring to step 306a). For example, if the number of words identified during the OCR operation is 10 and the predetermined percentage is 10%, the processor 204 may determine the pre-defined statistical score threshold as 1. Accordingly, if the processor 204, in the step 306d determines that the calculated statistical score is greater than 1 (i.e., the pre-defined statistical score threshold), the processor 204 determines that the OCR operation performed in the step 306a is not acceptable and accordingly performs the step 308.

Referring to FIG. 4A, it can be observed that the statistical score (depicted by 433) is compared with the pre-defined statistical score threshold (depicted by 436) to determine whether the quality of the OCR performed on the first section 422a is acceptable. Assuming that the pre-defined statistical score threshold (depicted by 436) is 3, and as discussed supra that the statistical score for the first section 422a is 4, therefore, the processor 204 determines that the quality of the OCR performed on the first section 422a and the quality of the image of the first section 422a is below par. Therefore, the processor 204 performs the step 308 (referring to FIG. 3A).

Referring back to FIG. 3A, at step 308, the computing device 102 may include means, such as the processor 204, for generating modified section by modifying one or more image characteristics of the section. In some embodiments, modifying the one or more image characteristics may include, but not limited to, adding or removing blur, modifying color characteristics of the section (for example, from color to grayscale, and vice versa), modifying contrast of the section, modifying hue of the section, and/or the like. In an example embodiment, the processor 204 may utilize one or more known image processing techniques such as, but are not limited to, Fast Fourier Transform (FFT) with various Gaussian kernels, e.g., 0.9, 1.0, and 1.1 of the OCR stroke width, and Gaussian Blur to modify the one or more image characteristics of the section. Referring to FIG. 4A, it can be observed that the contrast of the first section 422a is modified to create the modified first section 438a. Further, in the modified first section 438a, it can be observed that the word "Honeywell" is much clearly visible in comparison to the first section 422a. After modifying the one or more image characteristics of the section, the processor 204 may be configured to repeat the step 306 for the modified section.

For example, the processor 204 may be configured to determine the statistical score for the modified section (as described in step 306c). Further, the processor 204 stores the statistical score for the modified section in the memory device 202. Additionally, the processor 204 stores the generated text determined for the modified section in the memory device 202. In an example embodiment, the processor 204 may be further configured to update the bin for each of the one or more errors, identified in the generated text, and associated with the modified section. In an example embodiment, the updated bin includes the correct text determined for an error, identified during image evaluation process executed on the modified section, in addition to the correct text determined for the error identified during image evaluation process executed on the original section.

In an example embodiment, the processor 204 may be configured to repeat the step 306 until the statistical score is less than the pre-defined statistical score threshold. In some example embodiments, the statistical score may never become less than the pre-defined statistical score threshold despite of multiple modifications made to the section. Therefore, to prevent the processor 204 from infinitely modifying the section, the processor 204 may halt the image evaluation process being performed on the section after a predefined time period has elapsed. In an example embodiment, the predefined time period corresponds to a maximum time duration for which the execution of the image evaluation process can be repeated on a section of the plurality of sections. In an example embodiment, when the predefined time period has elapsed, the processor 204 may be configured to perform the step 310.

In some embodiments, the scope of the disclosure is not limited to performing the step 306d to determine whether the statistical score (determined for the section) is less than the pre-defined statistical score threshold. In an alternate embodiment, the step 306d is optional and alternately, the processor 204 may perform step 306e after the step 306c. Referring to FIG. 3B, at step 306e, the computing device 102 may include means, such as the processor 204, for determining the pre-defined statistical score threshold. In an example embodiment, the processor 204 may be configured to determine the statistical score that has been determined for the section in the previous iteration as the pre-defined statistical score threshold. For example, the processor 204 has modified a section once by iteratively performing the steps 306 and 308. Further, the processor 204 has determined statistical score determined for the modified section (modified in the step 308) is 5 and the statistical score determined (refer to the step 306c) for the original section is 6, the processor 204 considers the statistical score determined for the original section as the pre-defined statistical score threshold. Similarly, if a section has been modified n times, the processor 204 may determine the statistical score determined in the $(n-1)^{th}$ iteration as the pre-defined statistical score threshold for the $n^{th}$ iteration.

At step 306f, the computing device 102 may include means, such as the processor 204, for determining whether the statistical score determined for the modified section (determined in the current iteration) is equal to the pre-defined statistical score threshold (i.e., equal to the statistical score determined in the previous iteration). If the processor 204 determines that the statistical score is not equal to the pre-defined statistical score threshold, the processor 204 may be configured to perform the step 308. However, if the processor 204 determines that the statistical score is equal to the pre-defined statistical score threshold, the processor 204 may be configured to perform the step 310.

For example, processor 204 modifies the section thrice and the following table illustrates the statistical score determined for the section and the corresponding modifications:

TABLE 1

Modified sections and corresponding statistical scores

| Iteration | Statistical score |
|---|---|
| Original section | 4 |
| First modified section | 5 |
| Second modified section | 3 |
| Third modified section | 3 |

Referring to table 1, the processor 204 determines that the statistical score for the first modified section as 5. Further, while performing the step 306f for the first modified section, the processor 204 considers the statistical score determined for the original section as the pre-defined statistical score threshold. Similarly, while performing the step 306f for the third modified section the processor 204 considers the statistical score determined for the second modified section as the pre-defined statistical score threshold. The processor 204 determines that the statistical score determined for the third modified section is same as the pre-defined statistical score threshold (i.e., the statistical score for the second modified section), therefore the processor 204 may perform the step 310.

Performing steps 306e and 306f, enables the processor to determine whether modifying the image characteristics of the section is having an effect on the statistical score. If the modifying the one or more image characteristics is not having an effect on the statistical score, the processor 204 may halt the repetitions of the step 306 and 308.

In some embodiments, the processor 204 may determine the statistical score that has been determined in the previous iteration as the pre-defined statistical score threshold. However, in alternate embodiment, the processor 204 may consider an average of the statistical score determined in the previous iterations as the pre-defined statistical score threshold. For example, if the processor 204 has modified the section n times, the processor 204, for the nth iteration, may determine the pre-defined statistical score threshold as an average of the statistical scores determined during pervious n-1 iterations.

Other statistical methods of determining the pre-defined statistical score threshold may be contemplated. For example, the pre-defined statistical score threshold may be determined as a mean, a median of the statistical scores determined in the previous iterations.

Referring now to FIG. 3A, at step 310, the computing device 102 include means, such as the processor 204, for determining whether the image evaluation process (illustrated by step 306) has been executed on each of the plurality of sections in each of the plurality of images. If the processor 204 determines that the image evaluation process has not been executed on each of the plurality of sections in each of the plurality of images, the processor 204 may be configured to repeat the step 306 for other sections in the plurality of sections in each of the plurality of images.

For example, referring to FIG. 4A, the processor 204 may execute the image evaluation process on the sections 422b, 424a, and 424b, and accordingly modify the one or more image characteristics of the sections 422b, 424a, and 424b, if required. For instance, for the second section 422b, the processor 204 may perform the OCR to identify text (depicted by the generated text 440) captured in the second section 422b, as described in the step 306a. Thereafter, the processor 204 may identify the one or more errors in the generated text for the second section 422b, as described in the step 306b. For example, the text included in the image of the second section 422b is "he should work hard" (depicted by 442), and on performing the OCR operation, the generated text is identified as "he $hould work hard" (depicted by 444). For each of the one or more words in the generated text, the processor 204 determines whether a word of the one or more words includes erroneous text, as described in the step 306b. For instance, the processor 204 may determine that the word "$hould" (depicted by 446), in the generated text, includes a special character "$", which is the starting character of the word having data type alphabetical character. Therefore, the processor 204 may identify the word "$hould" (depicted by 446) as an error (as described in the step 306b-3). Thereafter, the processor 204 may be configured to query the linguistic database 208 to retrieve the one or more known words. Further, the processor 204 may be configured to compare the identified word "$hould" (depicted by 446) with the one or more known words to identify a known word that corresponds to the correct text for the identified word "$hould" (depicted by 446) (as described in steps 306b-3 and 306b-8). As discussed above in the step 306b-3 and 306b-8, to identify the known word, the processor 204 determines the distance between the identified word and each of the one or more known words in the linguistic database 208. Thereafter, the processor 204 identifies the word that is at minimum distance from the identified word "$hould" (depicted by 446) as the correct text (as described in the step 306b-8). For instance, the processor 204 identifies the word "should" as the correct text for the identified word "$hould" (depicted by 446). In an example embodiment, the distance between the identified word "$hould" (depicted by 446) and the word "should" is one (as only one character needs to be modified in the identified word "$hould" (depicted by 446) to arrive at the word "should"). Additionally, the processor 204 stores the correct text in a bin (depicted by 448) for the error "$hould".

Thereafter, processor 204 may be configured to determine the statistical score (depicted by 450) for the second section 422b. As the first count of the one or more errors in the second section 422b is one and the second count of the number of characters modified is also one, therefore, the processor 204 may determine the statistical score (depicted by 450) as two (sum of the first count and the second count), as is described in the step 306c. Subsequently, the processor 204 may be configured to compare the statistical score (depicted by 450) with the pre-defined statistical score threshold (depicted by 436) to determine whether the calculated statistical score (depicted by 450) is less than the pre-defined statistical score threshold (depicted by 436), as described in the step 306d. As the statistical score (depicted by 450) determined for the second section 422b is 2 and the pre-defined statistical score threshold value (depicted by 436) is three, therefore, the processor 204 determines that the statistical score (depicted by 450) is below the pre-defined statistical score threshold (depicted by 436). Therefore, the processor 204 determines that the generated text (depicted by 440) determined for the second section 422b is accurate and the quality of the image of the second section 422b is acceptable. Therefore, no further iterations of image evaluation process are executed on the second section 422b.

Further referring to FIG. 4A, it can be observed that the second section 424b (segmented from the second image 424) includes same text content 110 as that of the second section 422b. However, the generated text (depicted by 452) identified from the second section 424b (i.e., "hc ehould word hard") includes two errors. For the two errors, the processor 204 may utilize the methodologies described in the step 306b-8 to identify the correct text for the errors. For instance, the processor 204 may determine the correct text for the identified word "ehould" and "hc" as "could" and "he", respectively. Further, the processor 204 may update the bin corresponding to the errors, if the bin for the error has been previously created. For instance, the processor 204 may update the bin 448 (previously created for the error "$hould" (depicted by 446)) to include the correct text identified by the processor 204 for the error "ehould". Therefore, the bin 448 includes words "should" and "could" (i.e., the correct text for the identified words "$hould" (depicted by 446) and "ehould", respectively). If the bin for an error has not been previously created, the processor 204 may be configured to create the bin for the error. For instance, the processor 204 creates a bin (depicted by 454) for the error "hc" and stores the correct text "he" in the bin (depicted by 454).

Thereafter, the processor 204 performs similar operations on the first section 424a.

Referring back to FIG. 3A, at step 312, the computing device 102 includes means, such as the processor 204, for selecting an optimal section corresponding to each of the plurality of sections amongst the plurality of images. The selection of the optimal section has been further described in conjunction with FIG. 3D.

Figure 3D:
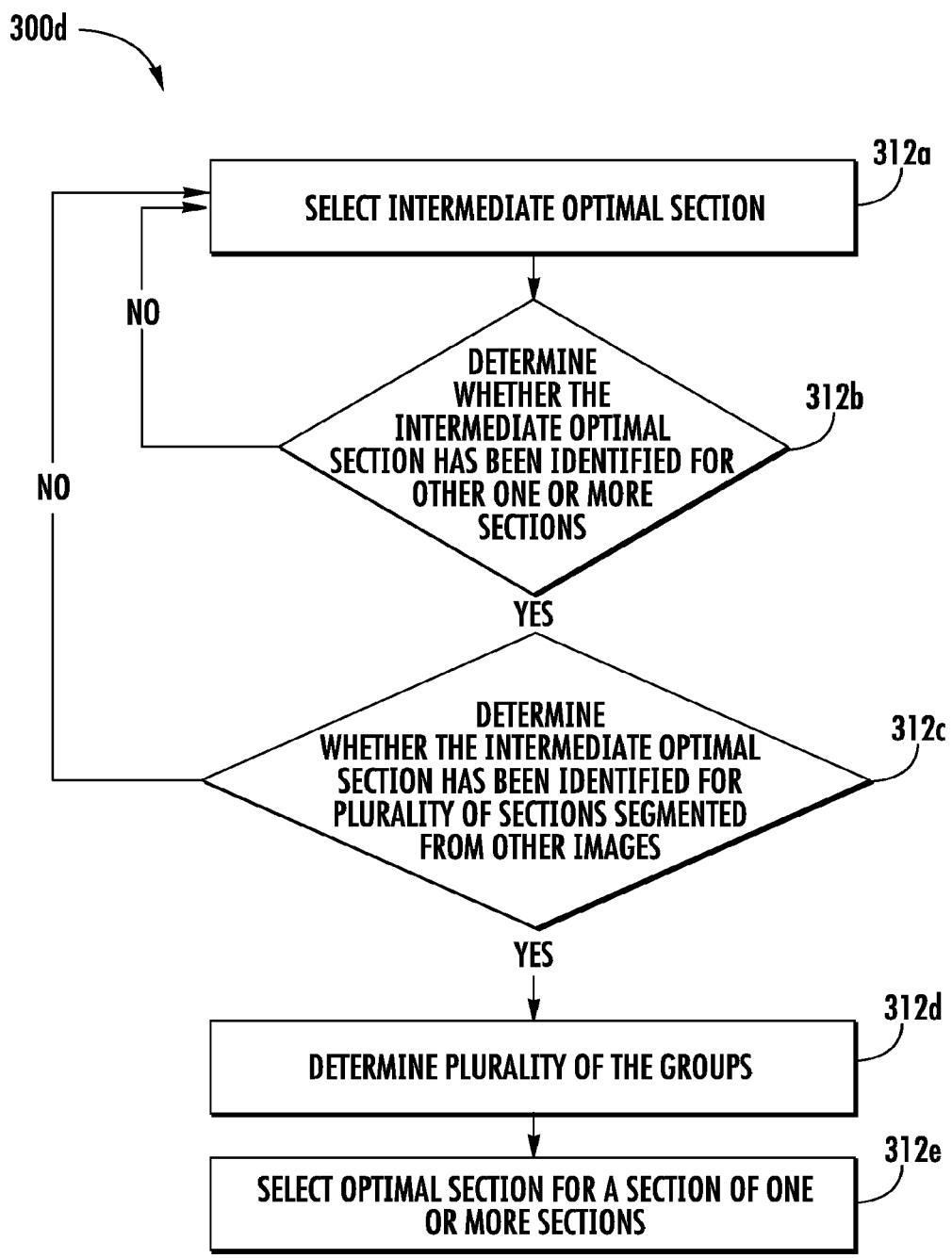

Referring to FIG. 3D, a flowchart 300D illustrates a method for selecting an optimal section amongst the plurality of images, such as, for example, step 312 as described above with reference to FIG. 3A in accordance with some embodiments.

At step 312a, the computing device 102 includes means, such as the processor 204, for selecting an intermediate optimal section for a section (segmented from an image of the plurality of images). As discussed above, during the execution of the image evaluation process, the processor 204 is configured to store the sections originally segmented from the image (hereinafter referred to as original section), as well as the corresponding modified sections (obtained after modification of the one or more image characteristics of the section, as described in the step 308) in the memory device 202. The processor 204 may be configured to select the intermediate optimal section from the original section and the corresponding modified sections. In an example embodiment, the intermediate optimal section has minimum statistical score among the original section and the corresponding modified sections. In an example embodiment, the processor 204 may be further configured to retrieve the generated text corresponding to the intermediate optimal section from the memory device 202.

At step 312b, the computing device 102 includes means, such as, for determining whether the intermediate optimal section has been identified for other sections of the plurality of sections segmented from the image. In an example embodiment, the processor 204 may be configured to perform the determination. If the processor 204 determines that the intermediate optimal section has not been identified for any other section in the plurality of sections, the processor 204 may be configured to repeat the step 312a for the other sections in the plurality of sections. If the processor 204 determines that the intermediate optimal section has been identified for all other sections in the plurality of sections, the processor 204 may be configured to perform the step 312c.

At step 312c, the computing device 102 includes means, such as, for determining whether the intermediate optimal section has been identified for the plurality of sections segmented from the other images of the plurality of images. If the processor 204 determines that the intermediate optimal section has not been identified for the plurality of sections segmented from the other images of the plurality of images, the processor 204 may be configured to repeat the steps 312a and 312b for the plurality of sections segmented from the other images of the plurality of images. However, if the processor 204 determines that the intermediate optimal section has been identified for the plurality of sections segmented from the other images of the plurality of images, the processor 204 may be configured to perform the step 312d.

At step 312d, the computing device 102 includes means, such as the processor 204, for determining a plurality of groups. In an example embodiment, each group of the plurality of groups correspond to a section of the plurality of sections. Further, each group of the plurality of groups includes the intermediate optimal sections identified for the corresponding section across the plurality of images. Further, the intermediate optimal sections, in a group of the plurality of groups, correspond to a same portion of the predetermined scene (captured by the image capturing device).

At step 312e, the computing device 102 includes means, such as the processor 204, for selecting the optimal section, for each section of the plurality of sections, from the corresponding groups of the plurality of groups. As discussed above in conjunction with step 312d, each of the plurality of group includes the intermediate sections (corresponding to a section of the plurality of sections) to select the optimal section for the section, the processor 204 may be configured to select the optimal section amongst the intermediate section included in the group. In an example embodiment, the optimal section (for the section) selected from each group has minimum statistical score. The selection of the optimal section for each of the plurality of sections has been further described in conjunction with FIG. 4B.

Referring to FIG. 4B, the intermediate optimal section (depicted by 456) for the first section 422*a* is selected amongst the original first section 422*a* and the modified first section 438*a*. As discussed above, the statistical score for the first section 422*a* is four (depicted by 433). Assuming that the statistical score for the modified section 438*a* is three (depicted by 435). Therefore, the processor 204 will select the modified section 438*a* as the intermediate optimal section (depicted by 456) for the first section 422*a* (segmented from the first image 422). Further, it can be observed that there are no modified sections corresponding to the second section 422*b*. Therefore, the original second section 422*b* is selected as the intermediate optimal section (depicted by the 458) for the second section 422*b* (segmented from the first image 422). Similarly, the processor 204 may be configured to select the intermediate optimal section (depicted by 460) for the first section 424*a* in the second image 424, and the intermediate optimal section (depicted by 462) for the second section 424*b* in the second image 424.

Thereafter, the processor 204 is configured to determine the plurality of groups (depicted by 461). The plurality of groups includes a first group 461*a* and a second group 461*b*. In an example embodiment, the first group 461*a* includes the intermediate optimal sections corresponding to the first sections (422*a* and 424*a*). Referring to FIG. 4B, the first group 461*a* includes the intermediate optimal sections 456 and 460. Similarly, the second group 461*b* includes intermediate optimal sections (458 and 462) that correspond to the second sections (422*b* and 424*b*). Further, it can be observed that the intermediate optimal sections 456 and 460 correspond to images that have the same content (i.e., same paragraph of the text content 110). Similarly, the intermediate optimal sections 458 and 462 are images of the same content.

From each of the first group 461*a* and the second group 461*b*, the processor 204 selects the optimal section based on the statistical score associated with the intermediate optimal sections included in the respective groups. In an example embodiment, since the modified first section 438*a* is selected as the intermediate section 456, the statistical score for the modified first section 438*a* is considered as the statistical score of the intermediate optimal section 456, which is three (depicted by 435). Similarly, the statistical score of the intermediate optimal section 460 (selected for the first section 424*a* in the second image 424) is equal to the statistical score of the first section 424*a* (assuming, the statistical score for the first section 424*a* is one (depicted by 437)). Since the statistical score of the intermediate optimal section 460 is less than the statistical score of the intermediate optimal section 456, the intermediate optimal section 460 is selected from the first group 461*a* as the optimal section (depicted by 464) for the first section (depicted by 422*a* and 424*a*) across the plurality of images 406. Similarly, the processor 204 selects the optimal section (depicted by 466) amongst the intermediate optimal sections (458 and 462) in the second group 461*b*. Hereinafter, the optimal section determined for each of the plurality of sections across the plurality of images has been referred to as the one or more optimal sections.

In some example embodiments, the scope of the disclosure is not limited to first selecting the intermediate optimal sections and thereafter selecting the one or more optimal sections. In an example embodiment, the step 312*a*-312*c* may be optional. In such an embodiment, the processor 204 may be configured to directly determine the plurality of groups such that each group corresponds to a section of the plurality of sections. Further, each group includes one or more of the corresponding original sections and the corresponding modified sections determined across the plurality of images. Further, from each of the plurality of groups, the processor 204 may be configured to select the optimal section based on the statistical score associated with each of the one or more of the corresponding original sections and the corresponding modified sections.

Referring back to FIG. 3A, at step 314, the computing device 102 includes means, such as the processor 204, for combining the one or more optimal sections to generate the processed image. The processor 204 may be configured to utilize one or more known image stitching algorithms to combine the one or more optimal sections to generate the processed image. One such stitching algorithm has been described in conjunction with FIG. 3E.

Figure 3E:
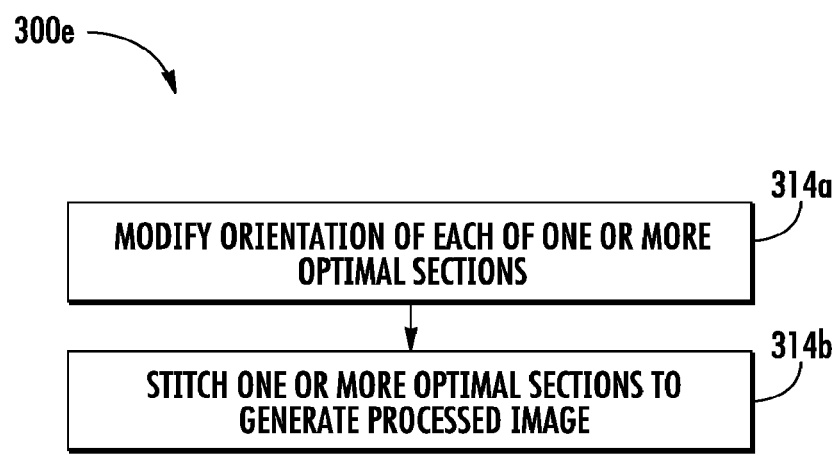

Referring to FIG. 3E, a flowchart 300E illustrates a method for generating the processed image, such as, for example, step 314 as described above with reference to FIG. 3A in accordance with some embodiments.

At step 314*a*, the computing device 102 includes means, such as the processor 204, for modifying an orientation of each of the one or more optimal sections such that each optimal section has same orientation. Prior to modifying the orientation of the one or more optimal sections, the processor 204 may be configured to determine the orientation of each of the one or more optimal sections with respect to a reference orientation. The reference orientation may correspond to an orientation that each of the one or more optimal section need to have before generation of the processed image. In an example embodiment, the operator of the computing device 102 an the image capturing device 104 may be configured to manually input the reference orientation prior to capturing the plurality of images. For instance, the reference orientation is zero degrees' rotation. Based on the reference orientation (i.e., zero degrees'), the processor 204 determines that the orientation of an optimal section of the one or more optimal sections is 30 degrees, and the orientation of another optimal section is 40 degrees.

After determination of the orientation of each of the one or more optimal sections, the processor 204 may be configured to modify the orientation of each of the one or more optimal sections such that the orientation of each of the one or more optimal sections becomes equal to the reference orientation.

At step 314*b*, the computing device 102 includes means such as for stitching the one or more optimal sections (with modified orientations) to generate the processed image. To stitch the one or more optimal sections, the processor 204 may be configured to determine a location of each of the one or more optimal sections where each of the one or more optimal sections needs to be positioned in the processed image.

The processor 204 may determine the location of each of the one or more optimal sections based on the location of the corresponding plurality of sections in the plurality of images. For example, the processor 204 determines that the plurality of images includes two section. The first section of the two section is positioned above the second section in the plurality of images. Therefore, the processor 204 determines that the optimal section determined for the first section is to be positioned above the optimal section determined for the second section.

After determining the location of each of the one or more optimal sections, the processor 204 may be configured to combine the text from one or more optimal sections in accordance with their locations to generate the processed image.

Referring to FIG. 4B, it can be observed that the optimal section 464 is stitched with the optimal section 466, to generate the processed image (depicted by 468). Further, it can be observed in the processed image (depicted by 468) that the optimal section 464 is positioned above the optimal section 466.

Referring back to FIG. 3A, at step 316, the computing device 102 includes means, such as the processor 204, for identifying the generated text in the processed image. The identification of the generated text in the processed image has been further described in conjunction with FIG. 3F 3G, and 3H.

Figure 3F:
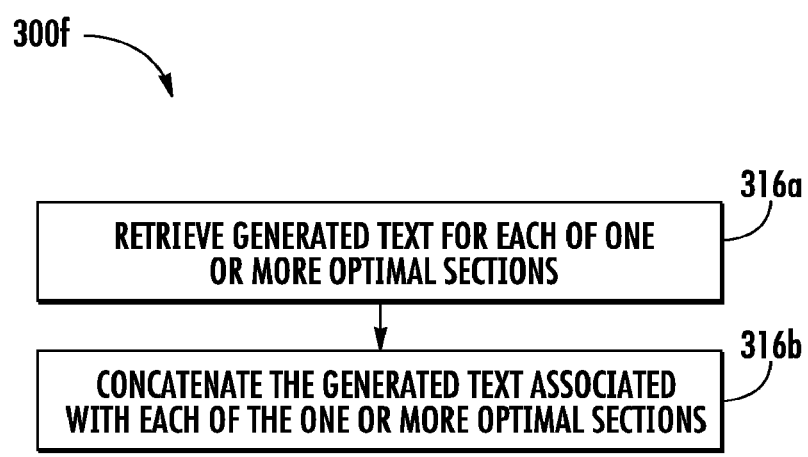

Referring to FIG. 3F, a flowchart 300F illustrates a method for identifying the generated text from the processed image, such as, for example, step 316 as described above with reference to FIG. 3A in accordance with some embodiments.

At step 316*a*, the computing device 102 includes means, such as the processor 204, for retrieving the modified generated text for the each of the one or more optimal sections, from the memory device 202. Since each of the one or more optimal sections corresponds to a section selected from the corresponding original section or the corresponding modified sections, the processor 204 is configured to retrieve the modified generated text associated with the section (selected as the optimal section) as the generated text of the optimal section. In an example embodiment, as discussed above, in the modified generated text, the one or more errors have been corrected.

For instance, referring to FIG. 4B, it can be observed that the optimal section (depicted by 464) in the processed image (depicted by 468) corresponds to the first section 424*a*. Therefore, the processor 204 may be configured retrieve the modified generated text identified in the first section 424*a* from the memory device 202, as the generated text of the optimal section (depicted by 464).

Since the one or more errors in the modified generated text associated with the one or more optimal sections have been corrected during the execution of the image evaluation process (step 306) on the corresponding section, the generated text retrieved for the one or more optimal sections is error free.

At step 316*b*, the computing device 102 includes means, such as the processor 204, for concatenating the generated text associated with each of the one or more optimal sections. In an example embodiment, the processor 204 may be configured to concatenate the generated text associated with each of the one or more optimal sections in accordance with the position of each of the one or more optimal sections in the processed image. For instance, the processed image includes two optimal sections out of which a first optimal section is positioned prior to the second optimal section. In such an example, the processor 204 may concatenate the generated text associated the two optimal sections in such a manner that the generated text for the first optimal section is positioned prior to the generated text for the second optimal section. Referring to FIG. 4B, the generated text is depicted by 470.

In some embodiments, the scope of the disclosure is not limited to identifying the generated text from the processed image. In an alternate embodiment, the processor 204 may be configured to generate text by performing steps 316*a*, and 316*b* without generating the processed image. In such embodiment, the processor 204 may be configured to directly perform the step 316 after performing the step 312 (i.e., selecting optimal section). Further, in such scenario, the processor 204 may not perform the step 314.

In some examples, the scope of the disclosure is not limited to the method for identifying the generated text of the processed image as described in the FIG. 3F. An alternate method for identifying the generated text for the processed image has been illustrated in FIG. 3G.

Figure 3G:
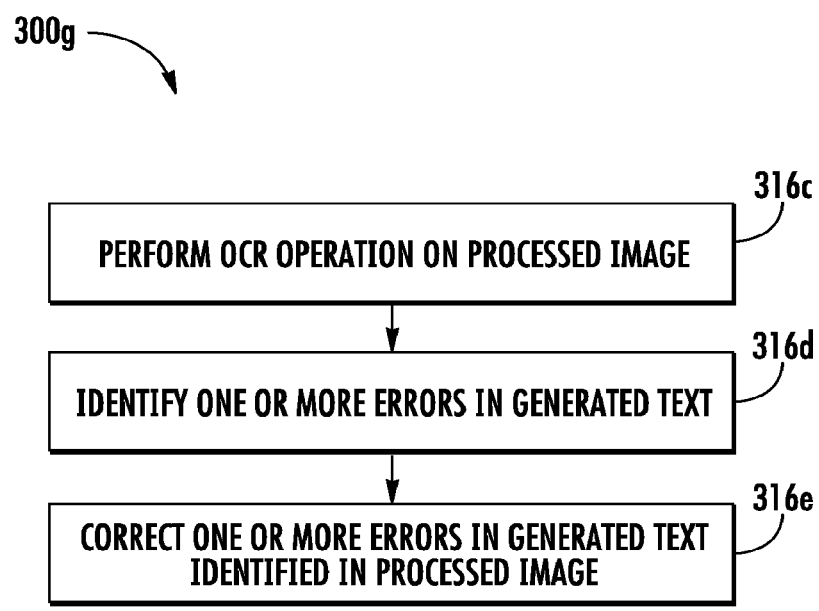

Referring FIG. 3G, a flowchart 300G illustrates a method for identifying the generated text in the processed image, such as, for example, step 316 as described above with reference to FIG. 3A in accordance with some embodiments.

At step 316*c*, the computing device 102 includes means, such as the processor 204, for performing an OCR operation on the processed image. In an example embodiment, the processor 204 may perform the OCR operation, as described in the step 306*a*.

At step 316*d*, the computing device 102 includes means, such as the processor 204, for identifying the one or more errors in the generated text. In an example embodiment, the processor 204 may be configured to identify the one or more errors utilizing the methodologies described in the step 306*b*.

At step 316*e*, the computing device 102 includes means, such as the processor 204, for correcting the one or more errors. In an example embodiment, the processor 204 may be configured to select the correct text for each of the one or more errors from the corresponding bin. As discussed above, a bin for an error includes the correct text identified for the error across the plurality of images. Therefore, the bin created for each of the one or more errors include multiple correct texts that have been identified across the plurality of images during each iteration of the image evaluation process. For example, for an error "$hould", the bin may include five instances of word "should" and three instances of word "could". This depicts that the word "should" has been considered as correct text for "$hould" five times during the image evaluation process, and the word "could" has been considered as the correct text three times.

Therefore, to correct the one or more errors identified in the generated text identified from the processed image, the processor 204 may be configured to correct the one or more errors by selecting the correct text from the corresponding bin. In an example embodiment, the processor 204 may select a word from the bin that has been identified as correct text for maximum number of times during the execution of the image evaluation process. For instance, for the error "$hould", the processor 204 may select "should" as the correct text, as the word "should" has been identified as the correct text five times during the execution of the image evaluation process on the plurality of sections across the plurality of images. Similarly, the processor 204 may correct the other errors identified in the generated text (identified from the processed image).

In some embodiments, the scope of the disclosure is not limited to correct the one or more errors in the generated text identified from the processed image, as is described in the step 316*e*. In alternate embodiment, the processor 204 may be configured to correct the one or more errors in the generated text identified from the processed image, as is further described in FIG. 3H.

Figure 3H:
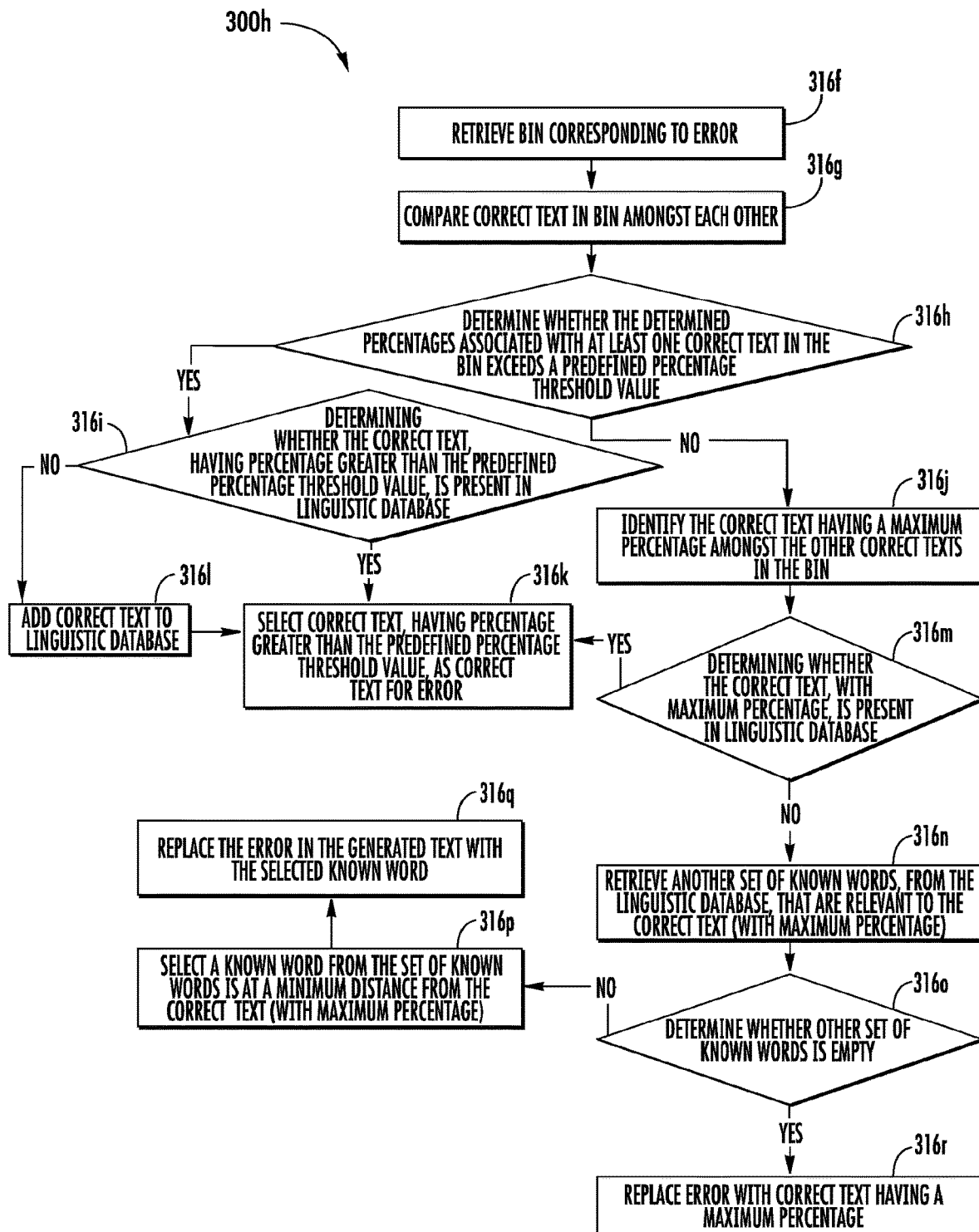

Referring FIG. 3H, a flowchart 300H illustrates a method for correcting the one or more errors in the generated text identified from the processed image.

At step 316f, the computing device 102 includes means, such as the processor 204, for retrieving the bin corresponding to an error of the one or more errors identified in the generated text identified from the processed image. In an example embodiment, the processor 204 may be configured to retrieve the bin from the memory device 202.

At step 316g, the computing device 102 includes means, such as the processor 204, for comparing the correct texts, identified for the error, included in the bin amongst each other. As discussed above that the bin includes multiple correct texts identified for the error across the plurality of images. Therefore, the processor 204 may be configured to compare the various correct texts that have been identified for the error amongst each other. In an example embodiment, the processor 204 may be configured to determine a count of instances a text has been identified as the correct text in the bin. Further, based on the count of instances associated with the correct text, the processor 204 may be configured to determine a percentage of instances of the text being identified as the correct text. For example, the processor 204 determines that for an error "$hould," the bin includes eight instances of word "should" and two instances of word "could." Further, the processor 204 determines that "should" has been identified as the correct text in 80% of the instances, and "could" has been identified as the correct text in 20% instances.

At step 316h, the computing device 102 includes means, such as the processor 204, for determining whether the determined percentages associated with at least one correct text in the bin exceeds a predefined percentage threshold value. In an example embodiment, the predefined percentage threshold value may be defined prior to operating the computing device 102. For example, the predefined percentage threshold is 80%.

If the processor 204 determines that the determined percentage associated with the at least one correct text exceeds the predefined percentage threshold value, the processor 204 may be configured to perform the step 316i. If the processor 204 determines that the determined percentage associated with each of the correct texts in the bin does not exceed the predefined percentage threshold value, the processor 204 may be configured to perform the step 316j.

At step 316i the computing device 102 includes means, such as the processor 204, for determining whether the correct text, having percentage greater than the predefined percentage threshold value, is present in the linguistic database. If the processor 204 determines that the correct text (having percentage greater than the predefined percentage threshold value) is present in the linguistic database, the processor 204 may be configured to perform the step 316k. However, if the processor 204 determines that the correct text (having percentage greater than the predefined percentage threshold value) is not present in the linguistic database, the processor 204 may be configured to perform the step 316l.

At step 316k, the computing device 102 includes means, such as the processor 204, for selecting the correct text (having percentage greater than the predefined percentage threshold value) as the correct text for the error.

At step 316l, the computing device 102 includes means, such as the processor 204, for adding the correct text (having percentage greater than the predefined percentage threshold value) in the linguistic database. Thereafter, the processor 204 may be configured to perform the step 316k.

Referring back to step 316h, as discussed, when the determined percentage associated with each of the correct texts in the bin does not exceed the predefined percentage threshold value, the processor 204 may be configured to perform the step 316j. At step 316j, the computing device 102 includes means, such as the processor 204, for identifying the correct text having maximum percentage amongst the correct texts in the bin. Thereafter, at step 316m, the computing device 102 includes means, such as the processor 204, for determining whether the correct text (with maximum percentage) is present in the linguistic database. If the processor 204 determines that the correct text (with maximum percentage) is present in the linguistic database, the processor 204 may be configured to perform the step 316k. However, if the processor 204 determines that the correct text (with maximum percentage) is not present in the linguistic database, the processor 204 may be configured to perform the step 316n.

At step 316n the computing device 102 includes means, such as the processor 204, for retrieving another set of known words, from the linguistic database, that are relevant to the correct text (with maximum percentage). In an example embodiment, the processor 204 may retrieve the other set of known words that are at a second predefined distance from the correct text with maximum percentage. In an example embodiment, the second predefined distance is different from the predefined distance that is utilized to retrieve the one or more known words from the linguistic database in the step 306b-4. Further, the second predefined distance is greater than the predefined distance. For example, if the predefined distance (utilized in the step 306b-4) is three, the second predefined distance is greater than three, for example, the second predefined distance is five. In an example embodiment, the processor 204 may be configured to utilize similar methodology as described in the step 306b-4 to retrieve the other set of known words that are relevant to the correct text with maximum percentage.

At step 316o, the computing device 102 includes means, such as the processor 204, for determining whether the other set of known words is empty. In an example embodiment, the if the processor 204 determines that the other set of known words is not empty (i.e., includes words retrieved from the linguistic database), the processor 204 performs the step 316p. At step 316p, the computing device 102 includes means, such as the processor 204, for selecting a known word from the set of known words that is at a minimum distance from the correct text (with maximum percentage). Thereafter, at the step 316q, the computing device 102 includes means, such as the processor 204, for replacing the error in the generated text with the selected known word. The selected known word is considered as the correct text for the error.

Referring back to step 316o, if the processor 204 determines that the other set of known words is empty, the processor 204 performs the step 316r. At step 316r, the computing device 102 includes means, such as the processor 204, for replacing the error with correct text having maximum percentage associated with it. Thereafter, the processor 204 may be configured to repeat the aforementioned steps for remaining errors in the generated text identified from the processed image.

In some example embodiments, the scope of the disclosure is not limited to processing the plurality of images as described in FIGS. 3A-3H. An alternate method for processing the plurality of images is illustrated in FIG. 5.

Figure 5:
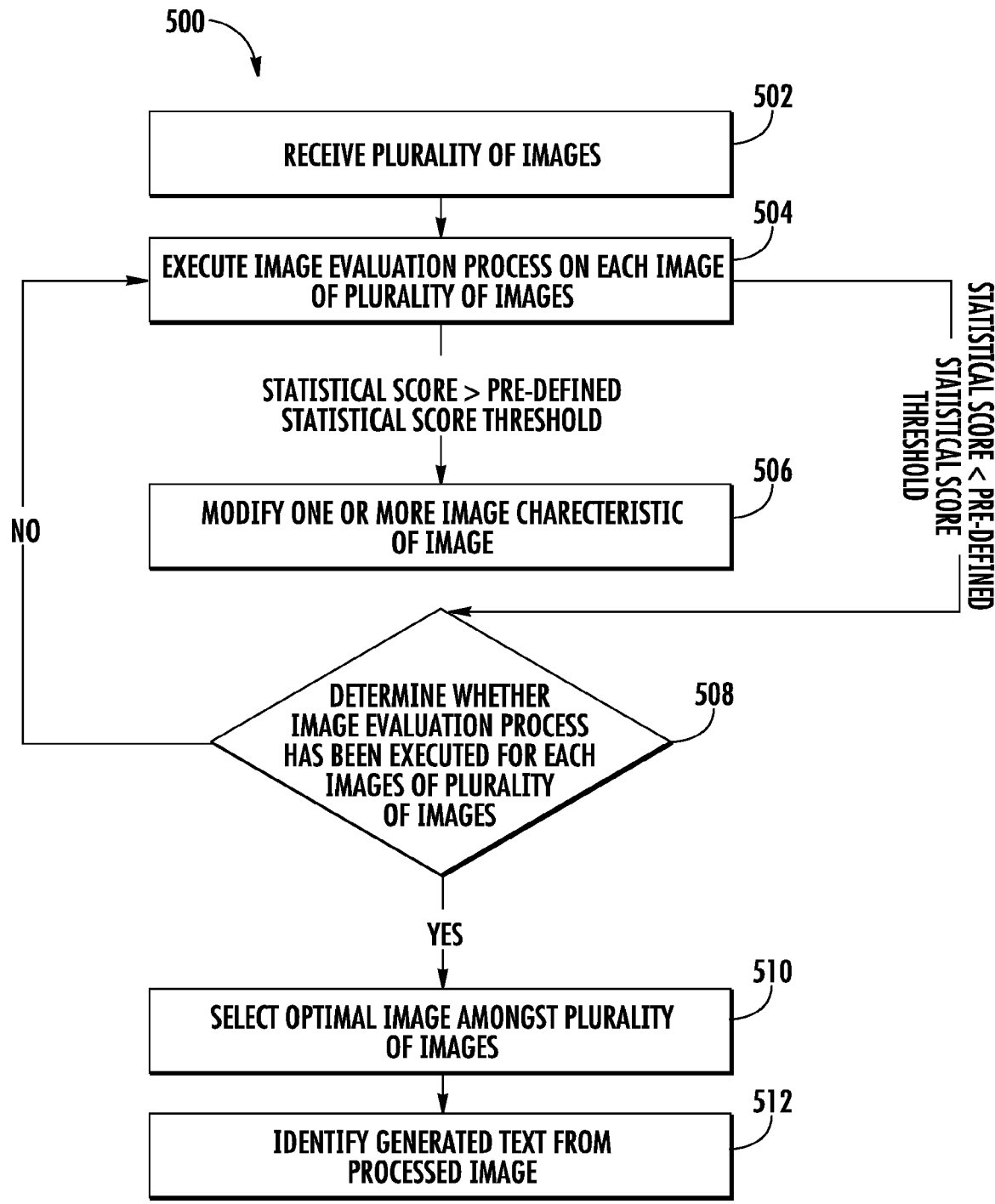
FIG. 5 is a flowchart illustrating example method, including processing a plurality of images, in accordance with one or more embodiments described herein.

FIG. 5 illustrates a flowchart 500 of another method for processing the plurality of images, in accordance with the one or more embodiments described herein.

At step 502, the computing device 102 includes means, such as the processor 204, for receiving the plurality of images of the object 108. In an example embodiment, the processor 204 may be configured to utilize methodologies described in the step 302 to receive the plurality of images.

At step 504, the computing device 102 includes means, such as the processor 204, for executing the image evaluation process on an image of the plurality of images. In an example embodiment, executing the image evaluation process includes performing the OCR operation on the image to identify text in the image (referred as the generated text), as is described in the step 306a. Thereafter, processor 204 may be configured to detect the one or more errors in the generated text of the image using methodologies described in the step 306b.

After identifying the one or more errors, the processor 204 may be configured to correct each of the one or more errors by replacing the erroneous text with the correct text, as is described in the step 306b-8. Concurrently, the processor 204 is configured to create the bin for each of the one or more errors. In an example embodiment, the bin includes the correct text with which the erroneous text has been replaced by the processor 204.

After replacing the erroneous text with the correct text, the processor 204 may be configured to calculate the statistical score for the image using the methodologies described in the step 306c. Thereafter, the processor 204 may be configured to compare the calculated statistical score with the pre-defined statistical score threshold to determine whether the statistical score exceeds the pre-defined statistical score threshold, as is described in the step 306d. If the processor 204 determines that the statistical score is greater than or equal to the pre-defined statistical score threshold, the processor 204 may be configured to perform the step 506. If the processor 204 determines that the statistical score is below the pre-defined statistical score threshold, the processor 204 may be configured to perform the step 508.

At step 506, the computing device 102 includes means, such as, for generating modified image by modifying the one or more image characteristics of the image. In an example embodiment, the processor 204 may be configured to modify the one or more image characteristics of the image using the methodologies described in the step 308. Thereafter, the processor 204 may be configured to repeat the step 504.

If at step 508, the computing device 102 includes means, such as the processor 204 for determining whether the image evaluation process (illustrated by step 504) has been executed for each image of the plurality of images. If the processor 204 determines that the image evaluation process has not been executed on each image of the plurality of images, the processor 204 may be configured to repeat the step 504 and 506 for other images in the plurality of images. If the processor 204 determines that the image evaluation process has been executed on each of the plurality of images, the processor 204 may be configured to perform the step 510.

At step 510, the computing device 102 includes means, such as the processor 204, for selecting an optimal image amongst the plurality of images. In an example embodiment, the processor 204 may be configured to select the optimal image using the similar methodology as described in the step 312. In an example embodiment, the optimal image corresponds to the processed image.

At step 512, the computing device 102 includes means, such as the processor 204, for identifying the generated text for the processed image. In an example embodiment, the processor 204 may be configured to identify the generated text for the processed image using the methodology as described in the step 316.

Figure 6:
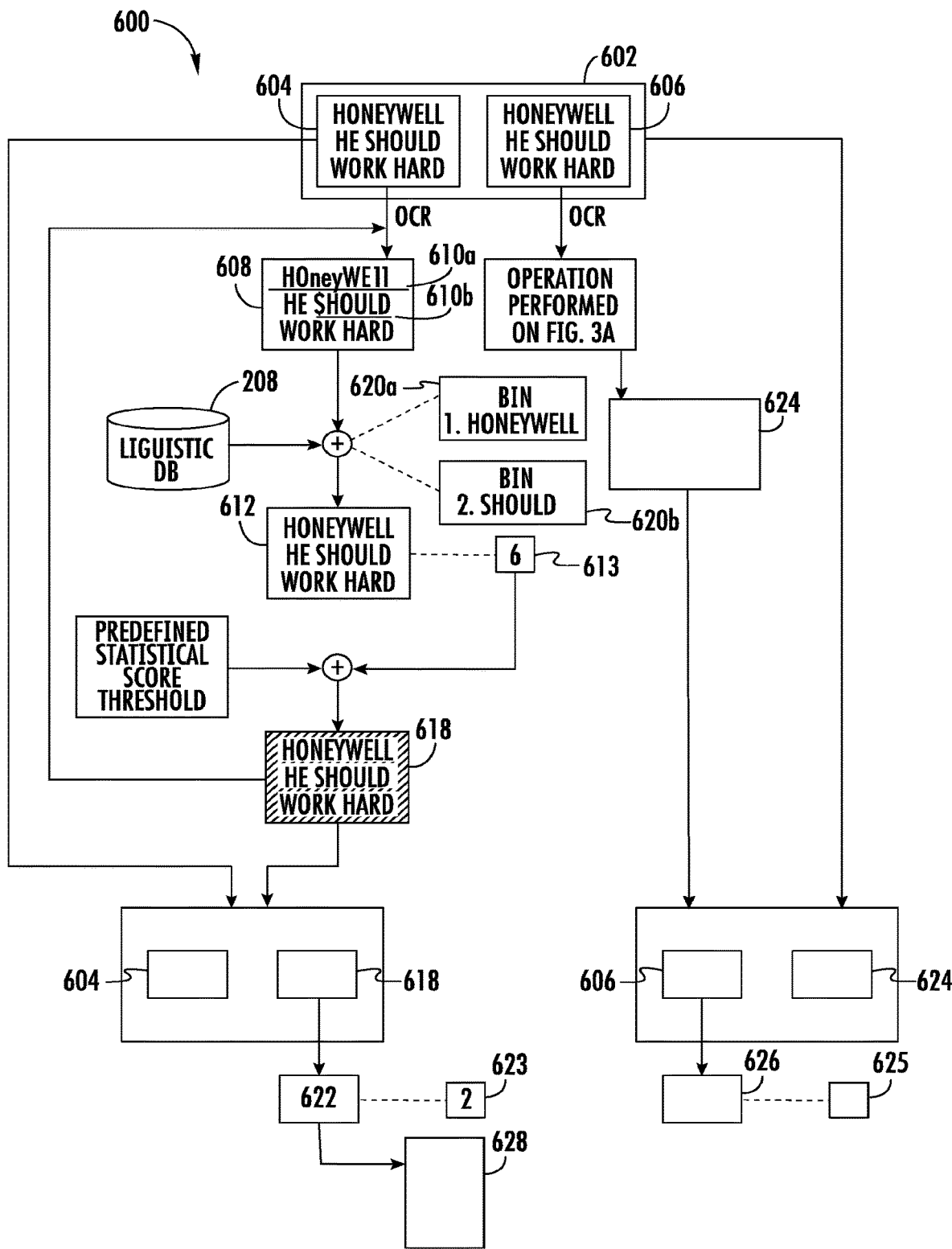
FIG. 6 illustrates another exemplary method, including processing a plurality of images, in accordance with one or more embodiments described herein.

FIG. 6 illustrates an exemplary method 600 for processing of the plurality of images, in accordance with one or more embodiments described herein.

It can be observed from the exemplary method 600 that the image capturing device is configured to capture the plurality of images (depicted by 602) of the object 108. For instance, the plurality of images 602 includes a first image 604 and a second image 606. The plurality of images 602 are transmitted to the computing device 102, where the processor 204 of the computing device 102 executes the image evaluation process on the plurality of images 602.

In the image evaluation process, the processor 204 is configured to perform OCR on the first image 604 to identify text captured in the first image 604 (referred as the generated text). For instance, the text in the first image 604 is "Honeywell he should work hard". The generated text (depicted by 608) (obtained after the OCR operation) is "H0neywell he $hould word hard".

Thereafter, the processor 204 may be configured to identify the one or more errors in the generated text 608 using the methodologies described in the step 306b-7. For instance, the one or more errors identified by the processor 204 includes "H0neywell" and "$hould" (depicted by 610a, and 610b). In an example embodiment, the processor 204 may be configured to compare the one or more errors with the one or more known words in the linguistic database 208 (by querying the linguistic database 208) to identify correct text corresponding to the one or more errors, as is described in the step 306b-8. As discussed above, determining the correct text includes determining a distance between the erroneous text and the one or more known words in the linguistic database 208. The known word that is at a minimum distance from the erroneous text corresponds to the correct text for the error. For instance, the correct text determined for "H0neywell" is "Honeywell" and the correct text determined for the "$hould" is "should". The processor 204 thereafter replaces the erroneous text with the correct text to generate modified generated text (depicted by 612).

In an example embodiment, the processor 204 is further configured to determine the statistical score (depicted by 614) for the first image 604. For instance, based on the methodologies described in the step 306c, the processor 204 determines the statistical score as 6 (depicted by 613) (i.e., sum of the count of the one or more errors and the sum of the distances between the correct text and the corresponding one or more errors). Thereafter, the processor 204 compares the determined statistical score (i.e., 6) with the pre-defined statistical score threshold (depicted by 616). For instance, the processor 204 determines that the calculated statistical score is greater than the pre-defined statistical score threshold, and modifies the one or more image characteristics of the first image 604 to generated modified first image (depicted by 618).

The aforementioned process is repeated for the first image 604 until the determined statistical is less than the pre-defined statistical score threshold or the predefined time period has elapsed. Further, the aforementioned process is repeated for the second image 606. For instance, during the image evaluation process, the modified second image 624 is generated.

The processor 204 may be configured to store the modified generated text (depicted by 612) determined during each iteration of the image evaluation process along with the corresponding first image or modified first section (depicted by 604 and 618, respectively). Additionally, the processor 204 may be configured to store the correct text determined for each of the one or more errors (in each iteration of image evaluation process) in the bins 620*a* and 620*b*. For instance, the bin 620*a* includes the correct text determined for the error "H0neywe11,"and the bin 620*b* includes the correct text determined for the error "$hould".

Thereafter, amongst the first image 604 and the corresponding modified first image 618, the processor selects an intermediate optimal image (depicted by 622). In an example embodiment, the intermediate optimal image 622 has minimum statistical score among the first image 604 and the corresponding modified first image 618. Therefore, the intermediate optimal image 622 has minimum count of errors among the count of errors identified in the first image 604 and corresponding modified first image 618. For instance, the modified first image 618 is selected as the intermediate optimal image 622. Similarly, between the second image 606 and the corresponding modified second image 624, the second image 606 is selected as the intermediate optimal image 626. In this example, the statistical score associated with the intermediate optimal image 622 is 2 (depicted by 623), and the statistical score associated with the intermediate optimal image 626 is 4 (depicted by 625).

The processor 204 may thereafter select an optimal image (depicted by 628) from the intermediate optimal image 622 and the intermediate optimal image 624. For instance, the processor 204 selects the intermediate optimal image 622 as the optimal image 628, since the statistical score associated with the intermediate optimal image 622 is less than the statistical score associated with the intermediate optimal image 624. The optimal image 628 corresponds to the processed image.

In some embodiments, the scope of the disclosure is not limited to capturing the plurality of images of the object 108 and accordingly processing the plurality of images to generate the processed image. In an example embodiment, the image capturing device 104 may be configured to capture a single image of the object 108. Further, the processor 204 may be configured to process the single image to generate the processed image. One such method of generating processed image from the single image has been described in conjunction with FIG. 7.

Figure 7:
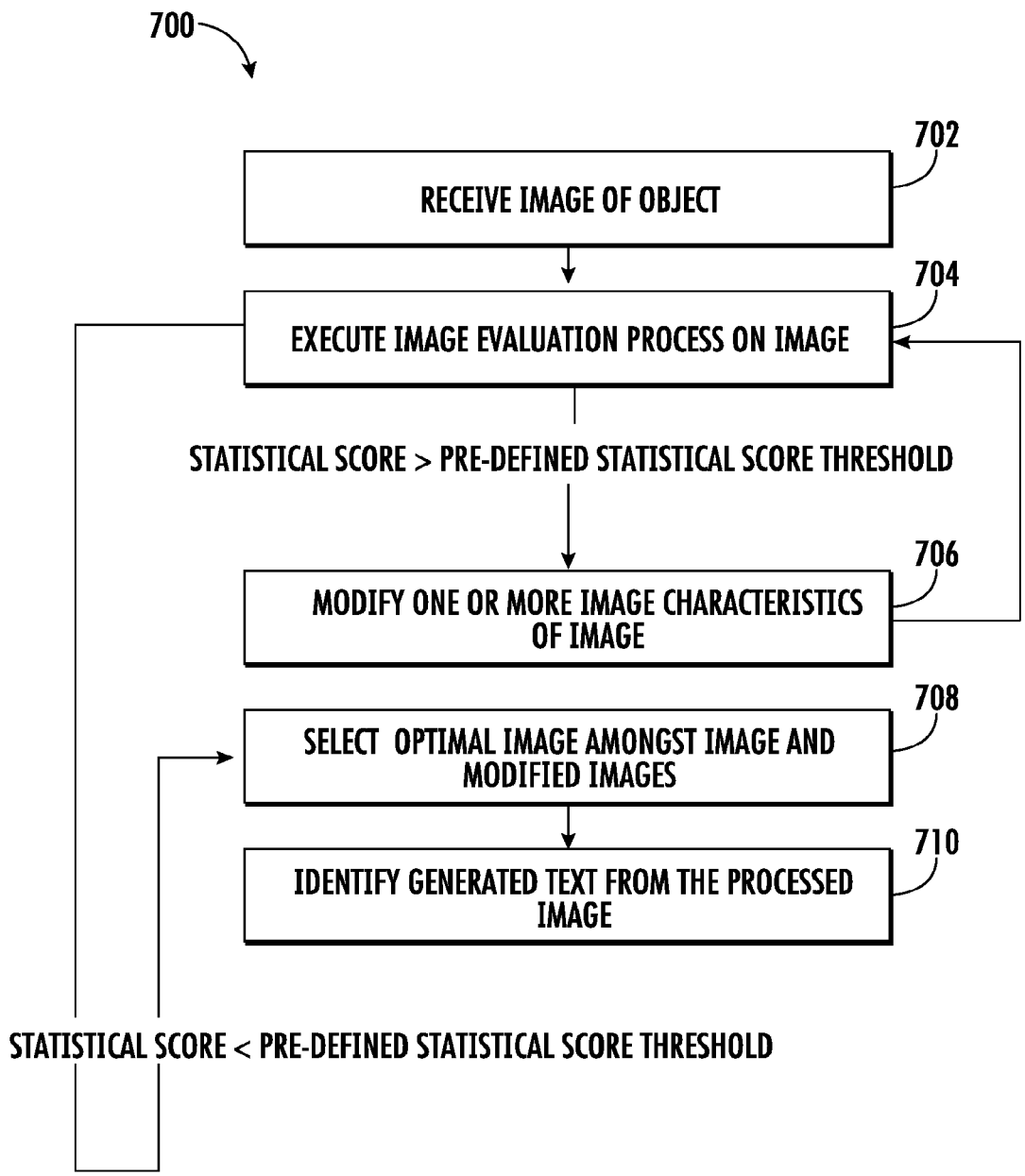
FIG. 7 is a flowchart illustrating methods, including processing a plurality of images, in accordance with one or more embodiments described herein.

FIG. 7 illustrates a flowchart 700 of a method for processing an image, in accordance with one or more embodiments described herein.

At step 702, the computing device 102 includes means, such as the processor 204, for receiving the image of the object 108. In an example embodiment, the processor 204 may be configured to utilize methodologies as described in the step 302 to receive the image.

At step 704, the computing device 102 includes means, such as the processor 204, for executing the image evaluation process on the image. In an example embodiment, executing the image evaluation process includes performing OCR operation on the image to identify text in the image (referred as the generated text), as is described in the step 306*a*. Thereafter, processor 204 may be configured to detect the one or more errors in the generated text of the image using methodologies described in the step 306*b*.

After identifying the one or more errors, the processor 204 may be configured to correct each of the one or more errors by replacing the erroneous text with the correct text, as is described in the step 306*b*-8. Concurrently, the processor 204 is configured to create the bin for each of the one or more errors. In an example embodiment, the bin includes the correct text with which the erroneous text has been replaced by the processor 204.

After replacing the erroneous text with the correct text, the processor 204 may be configured to determine the statistical score for the image using the methodologies described in the step 306*c*. Thereafter, the processor 204 may be configured to compare the calculated statistical score with the pre-defined statistical score threshold to determine whether the statistical score exceeds the pre-defined statistical score threshold, as is described in the step 306*d*. If the processor 204 determines that the statistical score exceeds the pre-defined statistical score threshold, the processor 204 may be configured to perform the step 706. If the processor 204 determines that the statistical score is below the pre-defined statistical score threshold, the processor 204 may be configured to perform the step 708.

At step 706, the computing device 102 includes means, such as the processor 204, for modifying the one or more image characteristics of the image to generate modified image. In an example embodiment, the processor 204 may be configured to modify the one or more image characteristics of the image using the methodologies described in the step 308. Thereafter, the processor 204 may be configured to repeat the step 704.

At step 708, the computing device 102 includes means, such as the processor 204, for selecting an optimal image amongst the image and the modified image (obtained after modification of the one or more image characteristics). In an example embodiment, the processor 204 may be configured to select the optimal image using similar methodology as described in the step 312. In an example embodiment, the optimal image corresponds to the processed image.

At step 710, the computing device 102 includes means, such as the processor 204, for identifying the generated text for the processed image. In an example embodiment, the processor 204 may be configured to identify the generated text for the processed image, using the methodology as described in the step 316.

Technical Advantages

The disclosed embodiments encompass numerous advantages. The processed image, in the disclosed embodiments, is generated based on at least the selection of the optimal section among the plurality of sections across the plurality of images. The generated text corresponding to the optimal section has less count of errors in comparison to the count of errors identified in the plurality of sections. Therefore, when the OCR is performed on the processed image, composed of the one or more optimal sections, the count of the one or more errors is much less in comparison to count of the one or more errors identified when the OCR is performed in the plurality of images. Further, the one or more errors detected in the generated text identified from the processed image are corrected by selecting correct text from the bin based on consensus. Therefore, there is a high likelihood that the correct text is indeed correct for the error. Further, since the identification of the corrected text is performed automatically, therefore no manual intervention is required in identification of the text from the image. Further, since the linguistic database is updated in each iteration, the linguistic database gets enriched with new words with each iteration. Such updating of the linguistic database improves the efficiency of the OCR operation in long run.

FIGS. 3A-3H through 7 illustrate example flowcharts describing operations performed in accordance with example embodiments of the present invention. It will be understood that each block of the flowcharts, and combinations of blocks in the flowcharts, may be implemented by various means, such as hardware, firmware, one or more processors, circuitry and/or other devices associated with execution of software including one or more computer program instructions. For example, one or more of the procedures described above may be embodied by computer program instructions residing on a non-transitory computer-readable storage memory. In this regard, the computer program instructions which embody the procedures described above may be stored by a memory of an apparatus employing an embodiment of the present invention and executed by a processor of the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart blocks. When executed, the instructions stored in the computer-readable storage memory produce an article of manufacture configured to implement the various functions specified in flowchart blocks. Moreover, execution of a computer other processing circuitry to perform various functions converts the computer or other processing circuitry into a particular machine configured to perform an example embodiment of the present invention. Accordingly, the operations set forth in the flowcharts define one or more algorithms for configuring a computer or processor to perform an example embodiment. In some cases, a general purpose computer may be provided with an instance of the processor which performs algorithms described in one or more flowcharts to transform the general purpose computer into a particular machine configured to perform an example embodiment.

Accordingly, the described flowchart blocks support combinations of means for performing the specified functions and combinations of operations for performing the specified functions. It will also be understood that one or more flowchart blocks, and combinations of flowchart blocks, can be implemented by special purpose hardware-based computer systems which perform the specified functions, or combinations of special purpose hardware that execute computer instructions.

In some example embodiments, certain ones of the operations herein may be modified or further amplified as described below. Moreover, in some embodiments, additional optional operations may also be included. It should be appreciated that each of the modifications, optional additions or amplifications described herein may be included with the operations herein either alone or in combination with any others among the features described herein.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The hardware used to implement the various illustrative logics, logical blocks, modules, and circuits described in connection with the aspects disclosed herein may include a general purpose processor, a digital signal processor (DSP), a special-purpose processor such as an application-specific integrated circuit (ASIC) or a field programmable gate array (FPGA), a programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively or in addition, some steps or methods may be performed by circuitry that is specific to a given function.

In one or more example embodiments, the functions described herein may be implemented by special-purpose hardware or a combination of hardware programmed by firmware or other software. In implementations relying on firmware or other software, the functions may be performed as a result of execution of one or more instructions stored on one or more non-transitory computer-readable media and/or one or more non-transitory processor-readable media. These instructions may be embodied by one or more processor-executable software modules that reside on the one or more non-transitory computer-readable or processor-readable storage media. Non-transitory computer-readable or processor-readable storage media may in this regard comprise any storage media that may be accessed by a computer or a processor. By way of example but not limitation, such non-transitory computer-readable or processor-readable media may include RAM, ROM, EEPROM, FLASH memory, disk storage, magnetic storage devices, or the like. Disk storage, as used herein, includes compact disc (CD), laser disc, optical disc, digital versatile disc (DVD), floppy disk, and Blu-ray disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media may be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the supply management system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

What is claimed is:

1. A system comprising:
a non-transitory computer-storage medium, configured to store a linguistic database;
a processor, in electrical communication with the non-transitory computer-storage medium, wherein the processor is configured to:
identify a plurality of paragraphs in a plurality of images;
based on the identified plurality of paragraphs, segment the plurality of images into a plurality of sections, wherein each section of each image of the plurality of images corresponds to another section of another image of the plurality of images;
for each section in each image:
identify one or more errors in text generated after performing optical character recognition (OCR) on each section based on a data type of at least one word in the generated text, a type of at least one character of the at least one word, or a position of the at least one character, and
calculate a statistical score based on the identification of the one or more errors;
determine a plurality of groups corresponding to the plurality of sections, wherein each group of the plurality of groups comprises one or more sections, generated across the plurality of images, wherein the one or more sections in each group have same content;
select, a section from each group, wherein generated text corresponding to the selected section from each group has a minimum statistical score among generated texts of the one or more sections in the corresponding group; and
combine each selected section from each of the plurality of groups to generate a processed image.

2. The system of claim 1, wherein the processor is further configured to:
identify erroneous text associated with the one or more errors; and
replace the erroneous text with correct text, wherein replacing further required processor to modify one or more characters in the generated text corresponding to the one or more errors based on querying the linguistic database.

3. The system of claim 2, wherein the statistical score is calculated based on a first count of the one or more errors, and a second count of the one or more characters modified during the replacement of the erroneous text.

4. The system of claim 2, wherein the linguistic database comprises texts corresponding to various languages and/or domains.

5. The system of claim 1, wherein the processor is further configured to:
determine a count of pixels, representing text content, along a width of an image of the plurality of images;
analyze distribution of the count of the pixels along a length of the image to identify the plurality of sections; and
segment the image into the plurality of sections based on identification of the plurality of sections.

6. The system of claim 1, wherein the processor is further configured to generate a processed text from the processed image, wherein identification of the processed text from the processed image requires the processor to:
perform OCR on the processed image to generate processed OCR text;
identify the one or more errors in the generated processed OCR text; and
correct each of the one or more errors in the generated processed OCR text by selecting correct text from one or more bins associated with the one or more errors, to generate the processed text.

7. The system of claim 1, wherein the processor is further configured to identify a processed text from the processed image, wherein identification of the processed text from the processed image requires the processor to:
retrieve generated text for each section in the processed image; and
concatenate the generated text for each section in the processed image to generate the processed text.

8. The system of claim 1, wherein the statistical score is calculated as a first count of the one or more errors.

9. The system of claim 1, wherein the statistical score is calculated as an average count of the one or more errors.

10. A computer-implemented method comprising:
identifying a plurality of paragraphs in a plurality of images;
based on the identified plurality of paragraphs, segmenting, by a processor, the plurality of images into a plurality of sections, wherein each section of each image of the plurality of images corresponds to another section of another image of the plurality of images;
for each section in each image:
identifying one or more errors in text generated by performing optical character recognition (OCR) on each section based on a data type of at least one word in the generated text, a type of at least one character of the at least one word, or a position of the at least one character, and
calculating a statistical score based on the identification of the one or more errors;
determining whether the statistical score is less than a pre-defined statistical score threshold;
determining a plurality of groups corresponding to the plurality of sections, wherein each group of the plurality of groups comprises one or more sections of the plurality of sections, generated across the plurality of images, wherein the one or more sections in each group have same content;
selecting, a section from each group, wherein generated text corresponding to the selected section from each group has a minimum statistical score among generated texts of the one or more sections in the corresponding group; and
combining each selected section from each of the plurality of groups to generate a processed image.

11. The computer-implemented method of claim 10, further comprising:
identifying erroneous text associated with the one or more errors; and
replacing the erroneous text with correct text, comprising:
modifying one or more characters in the generated text corresponding to the one or more errors based on querying a linguistic database.

12. The computer-implemented method of claim 11, wherein the linguistic database comprises text corresponding to various languages and/or domains.

13. The computer-implemented method of claim 10, further comprising:
determining a count of pixels, representing text content, along a width of an image of the plurality of images;

analyzing distribution of the count of the pixels along a length of the image to identify the plurality of sections; and segmenting the image into the plurality of sections based on identification of the plurality of sections.

14. The computer-implemented method of claim 10, further comprising correcting an error of the one or more errors in the generated text corresponding to each section in each image, wherein correct text for the error is selected from a bin generated for the error.

15. The computer-implemented method of claim 14, further comprising:
- performing OCR on the processed image to generate OCR text;
- identifying one or more errors in the generated OCR text; and
- correcting each of the one or more errors in the generated OCR text by selecting the correct text from one or more bins associated with the one or more errors, to generated processed text.

16. The computer-implemented method of claim 14 further comprising:
- retrieving generated text for each section in the processed image; and
- concatenating the generated text to generate processed text.

17. The computer-implemented method of claim 10, wherein the statistical score is calculated as a first count of the one or more errors.

18. The computer-implemented method of claim 10, wherein the statistical score is calculated as an average count of the one or more errors.

* * * * *